United States Patent
Diament et al.

(10) Patent No.: US 10,783,714 B2
(45) Date of Patent: Sep. 22, 2020

(54) METHODS AND SYSTEMS FOR AUTOMATICALLY TAILORING A FORM OF AN EXTENDED REALITY OVERLAY OBJECT

(71) Applicant: Verizon Patent and Licensing Inc., Arlington, VA (US)

(72) Inventors: Layton R. Diament, San Francisco, CA (US); Michael Y. Huang, Harrison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/261,058

(22) Filed: Jan. 29, 2019

(65) Prior Publication Data
US 2020/0242841 A1    Jul. 30, 2020

(51) Int. Cl.
| | |
|---|---|
| *G06T 19/00* | (2011.01) |
| *G06F 3/01* | (2006.01) |
| *H04N 13/279* | (2018.01) |
| *G06T 7/70* | (2017.01) |
| *H04N 13/293* | (2018.01) |
| *G06T 17/05* | (2011.01) |

(52) U.S. Cl.
CPC ............ *G06T 19/006* (2013.01); *G06F 3/011* (2013.01); *G06T 7/70* (2017.01); *G06T 17/05* (2013.01); *H04N 13/279* (2018.05); *H04N 13/293* (2018.05)

(58) Field of Classification Search
CPC combination set(s) only.
See application file for complete search history.

(56) References Cited

U.S. PATENT DOCUMENTS

| | | | | |
|---|---|---|---|---|
| 6,885,939 | B2* | 4/2005 | Schmidt | G01C 21/3638 701/428 |
| 8,896,629 | B2* | 11/2014 | Meier | G06F 3/147 345/633 |
| 8,941,685 | B1* | 1/2015 | Chapin | G06Q 30/0241 345/629 |
| 9,959,674 | B2* | 5/2018 | Chen | G06T 19/006 |
| 2009/0319348 | A1* | 12/2009 | Khosravy | G01C 21/20 705/14.1 |
| 2011/0276556 | A1* | 11/2011 | Meier | H04L 67/22 707/706 |
| 2012/0176410 | A1* | 7/2012 | Meier | G06F 3/147 345/633 |

(Continued)

*Primary Examiner* — Motilewa Good Johnson

(57) ABSTRACT

An exemplary extended reality presentation system presents, to a user, a field of view into an extended reality world, and identifies an augmentable object from a set of objects presented in the field of view. The system determines that the augmentable object is located at a first apparent proximity to the user, and presents, within the field of view, a first form of an overlay object graphically associated with the augmentable object. The first form is tailored to the first apparent proximity. Subsequent to determining that the augmentable object is located at the first apparent proximity, the system determines that the augmentable object has come to be located at a second apparent proximity to the user and replaces, within the field of view, the first form of the overlay object with a second form of the overlay object distinct from the first form and tailored to the second apparent proximity.

20 Claims, 9 Drawing Sheets

(56) References Cited

U.S. PATENT DOCUMENTS

| | | | |
|---|---|---|---|
| 2012/0264457 A1* | 10/2012 | Khosravy | G06Q 30/0241 |
| | | | 455/456.3 |
| 2013/0073988 A1* | 3/2013 | Groten | G01C 21/3679 |
| | | | 715/753 |
| 2016/0189426 A1* | 6/2016 | Thomas | G06T 19/006 |
| | | | 345/633 |
| 2019/0041651 A1* | 2/2019 | Kiemele | G06F 3/011 |
| 2019/0045178 A1* | 2/2019 | Lutter | G06F 3/012 |
| 2019/0065027 A1* | 2/2019 | Hauenstein | G06T 19/006 |

* cited by examiner

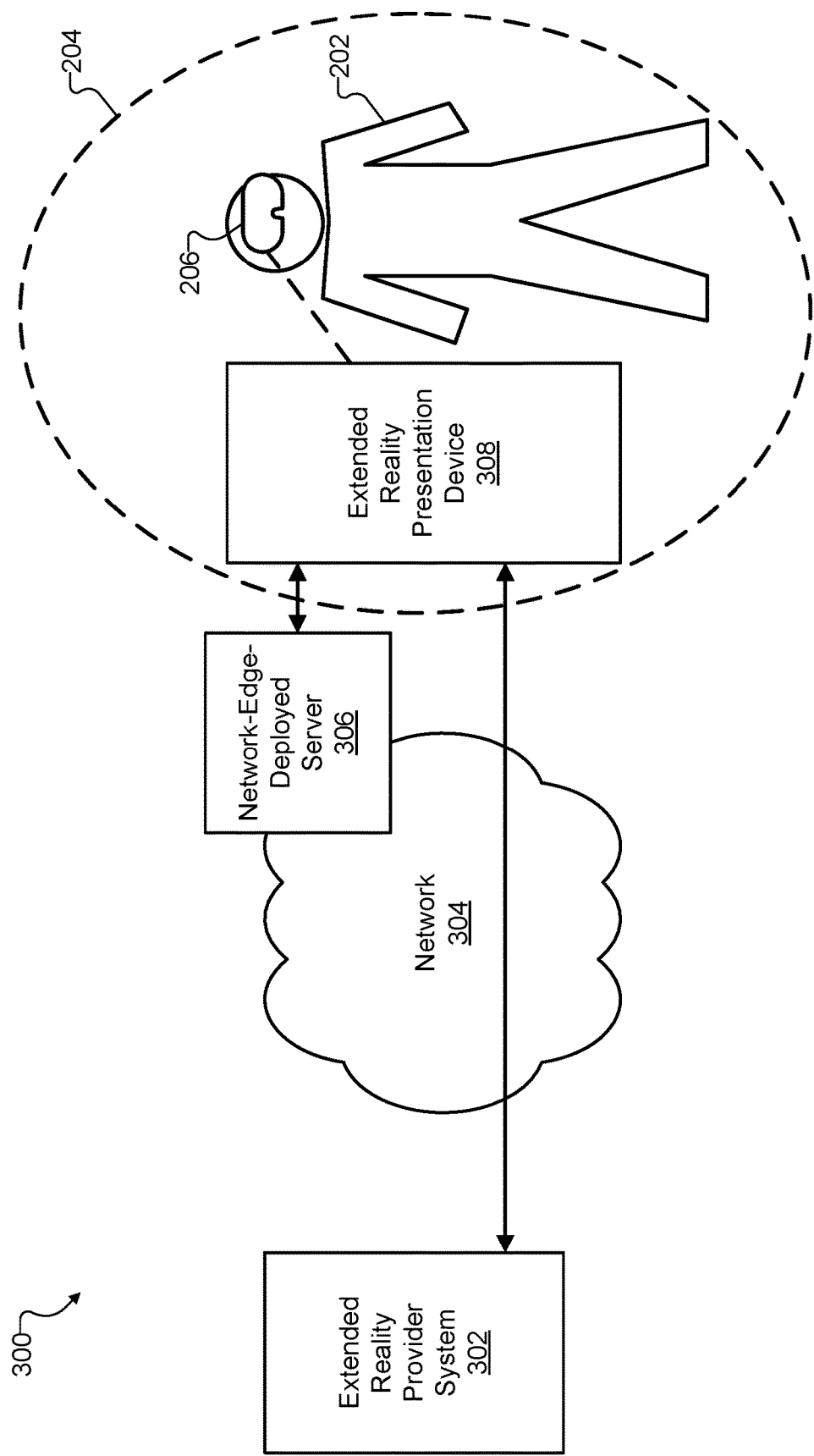

METHODS AND SYSTEMS FOR AUTOMATICALLY TAILORING A FORM OF AN EXTENDED REALITY OVERLAY OBJECT

BACKGROUND INFORMATION

Extended reality technologies such as virtual reality technologies, mixed reality technologies, augmented reality technologies, and so forth, allow users to experience extended reality worlds. For instance, in some examples, users may experience an extended reality world implemented as an augmented version of the real world using a mixed or augmented reality technology (e.g., using an augmented reality mobile device, wearing augmented reality glasses or contact lenses, etc.). In other examples, users may experience a completely simulated version of the real world or of an imaginary world using a virtual reality technology (e.g., using virtual reality goggles or the like). In these or other ways, extended reality technologies may thus provide users with an improved version of reality and/or a variety of entertainment, educational, vocational, and/or other enjoyable or valuable experiences that may be difficult or inconvenient for the users to obtain otherwise.

In various examples, certain real or simulated objects presented in an extended reality world may be augmented by being graphically associated with (e.g., overlaid with, integrated with, replaced by, etc.) simulated or virtual objects referred to herein as "overlay objects." Overlay objects may be presented in conjunction with other objects included in the extended reality world (e.g., real objects in the real world) in order to provide the user with more information about the other objects or to otherwise add value to the user's perception of the world.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 illustrates an exemplary configuration within which the extended reality presentation system of FIG. 1 may operate according to principles described herein.

DETAILED DESCRIPTION OF PREFERRED EMBODIMENTS

Figure 1:
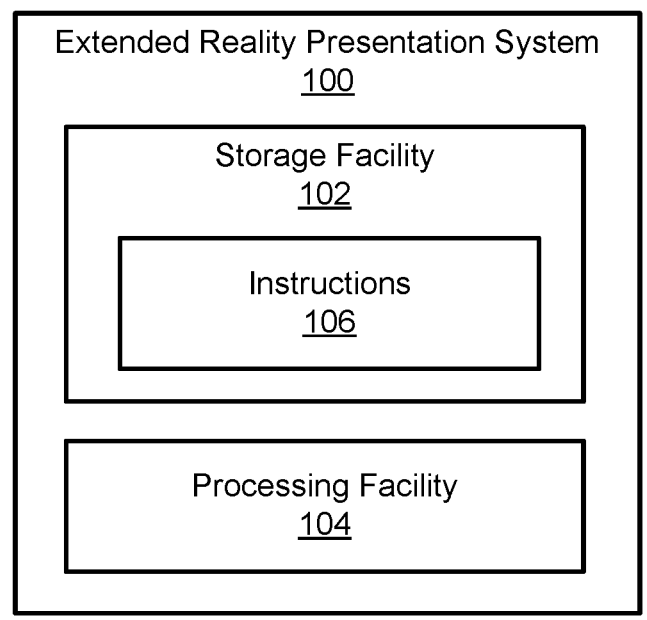
FIG. 1 illustrates an exemplary extended reality presentation system for automatically tailoring a form of an extended reality overlay object according to principles described herein.

Extended reality presentation systems for automatically tailoring a form of an extended reality overlay object based on an apparent proximity of an augmentable object to a user are described herein. For example, one embodiment of such an extended reality presentation system may present, to a user, a field of view into an extended reality world, and may identify an augmentable object from a set of objects presented in the field of view. In response to this identifying of the augmentable object, the extended reality presentation system may determine that the augmentable object is located at a first apparent proximity to the user, and, in response, may present within the field of view a first form of an overlay object graphically associated with the augmentable object. The first form of the overlay object may be tailored, in certain examples, to the first apparent proximity of the augmentable object to the user.

Subsequent to the determining that the augmentable object is located at the first apparent proximity, the extended reality presentation system may determine that the augmentable object has come to be located at a second apparent proximity to the user (e.g., an apparent proximity distinct from the first apparent proximity due to movement by either or both of the augmentable object and the vantage point of the user). In response to the determining that the augmentable object has come to be located at the second apparent proximity, the extended reality presentation system may replace, within the field of view, the first form of the overlay object with a second form of the overlay object distinct from the first form and tailored to the second apparent proximity. Various details of different forms of different overlay objects that may be presented in conjunction with augmentable objects at different apparent proximities to the user will be described in more detail below.

Implementations of extended reality presentation systems described herein may provide various advantages and benefits when compared to conventional extended reality presentation systems. Conventionally, only a single form of an overlay object to be graphically associated or otherwise displayed in connection with an augmentable object in an extended reality world is available for display. In some examples, this type of overlay object may be a constant or manually-alterable scale (e.g., apparent size) in relation to the field of view being used to present the overlay object, such that the overlay object does not change in scale even if the augmentable object does. In other examples, this type of overlay object may be a constant or manually-alterable scale in relation to the augmentable object itself, such that the overlay object grows larger and smaller based on the apparent size of the augmentable object in the field of view. Unfortunately, neither of these conventional scenarios involves any tailoring of the form of the overlay object based on apparent proximity or any other factor.

To help remedy this, methods and systems described herein are configured to automatically tailor the form of overlay objects based on the apparent proximity of augmentable objects to users, thereby significantly improving on conventional extended reality technologies. For example, while conventional systems with fixed-scale overlay objects do not closely associate overlay objects with augmentable objects that change in apparent proximity to the user (e.g., and thereby change in scale in the field of view), extended reality presentation methods and systems described herein closely and clearly associate overlay objects with the augmentable objects even as the apparent proximities of the augmentable objects dynamically change (e.g., by resizing the overlay objects to match the augmentable objects). At the same time, in contrast to conventional systems with variable-scale overlay objects, the overlay objects presented by methods and systems described herein not only vary in scale with the apparent proximity of the augmentable objects, but also vary in form so as to be appropriate and useful for any particular apparent proximity of the augmentable object.

For instance, if an augmentable object is far away (and thus presented as a small object within the field of view), the methods and systems described herein may use a basic, abbreviated form of the overlay object that can be fully appreciated (e.g., clearly read, easily viewed, etc.) by the user, rather than by shrinking down a form of the overlay object that is intended for closer viewing (e.g., and thus that may not be able to be clearly read or fully appreciated from a distance). As another example, if the augmentable object comes closer to the user (so as to be presented on a larger portion of the field of view), the methods and systems described herein may use a different or more detailed form of the overlay object that is more appropriate and tailored to the closer apparent proximity. For example, additional information (e.g., text, graphics, links, videos, etc.) not included on the basic form of the overlay object may be included on a form of the overlay object used when the augmentable object is more proximate to the user even though such information may not be appreciable when the augmentable object is relatively far away from the user. As will be described in more detail below, the first and second forms of the overlay object may be implemented or conceptualized, respectively, as a first overlay object associated with the augmentable object and a second, separate overlay object that is also associated with the augmentable object and that replaces the first overlay object under certain circumstances (e.g., based on the apparent proximity of the augmentable object). Content depicted by these first and second overlay objects (i.e., the first and second forms of the overlay object associated with the augmentable object) may relate to the augmentable object in any suitable way, as will be described in more detail below.

An additional benefit of the methods and systems described herein becomes apparent when the augmentable object comes in very close proximity to the user. In this example, conventional systems that scale a single form of an overlay object to remain constant with the size of the augmentable object may actually be inefficient or burdensome to users. For instance, when the augmentable object is in very close proximity to the user, information intended for viewing at an intermediate distance may be presented in a manner that makes it harder for the user to appreciate the content (e.g., by including text too large to read at a glance, graphics that fill nearly the entire field of view, etc.) and/or may be presented at the expense of other (potentially more useful) information. By providing different forms of the overlay object based on differences in apparent proximity (e.g., differences in augmentable object scale in the field of view), overlay information may be made to be closely associated with corresponding augmentable objects while including an optimal amount of information, presented in an optimal way, so as to be appreciable by and helpful to the user.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary extended reality presentation system 100 ("system 100") for automatically tailoring a form of an extended reality overlay object based on an apparent proximity of an augmentable object to a user. Specifically, as shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation. Each of facilities 102 and 104 within system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data received, generated, managed, used, and/or transmitted by processing facility 104 in a particular implementation.

Processing facility 104 may be configured to perform (e.g., execute instructions 106 stored in storage facility 102 to perform) various functions associated with automatically tailoring the form of overlay objects based on apparent proximities of augmentable objects to users. For example, processing facility 104 may be configured to present, to a user, a field of view into an extended reality world. To this end, processing facility 104 may include or be otherwise associated with any type of transparent, semi-transparent, or non-transparent device (e.g., lens, display screen, etc.) through which or upon which the user may view the extended reality world. For example, the device may be configured to present the extended reality world to the user as a heads-up display (e.g., a viewer worn directly in front of the user's eyes and allowing the user to move his or her head freely while continuously seeing the display, a projection onto a transparent display in front of an operator of a vehicle, etc.), a handheld display, and/or any other type of display as may serve a particular implementation.

As the field of view into the extended reality world is presented to the user, processing facility 104 may identify an augmentable object from a set of objects presented in the field of view. For example, the augmentable object may be an object or pattern in the world that is recognizable to system 100 and that system 100 is configured to augment in any of the ways described herein (e.g., by replacing a target area of the augmentable object with a virtual overlay object, etc.). In response to the identifying of the augmentable object, processing facility 104 may determine that the augmentable object is located at a first apparent proximity to the user, and, in response, may present within the field of view a first form of an overlay object graphically associated with the augmentable object. The first form may be tailored to the first apparent proximity in suitable way, examples of which will be described in more detail below. For example, if the first apparent proximity is a relatively far proximity (e.g., such that the augmentable object is relatively far away from the user and hence is displayed on a relatively small portion of the field of view), the first form of the overlay object may be a relatively simple and basic form of the overlay object with minimal content (e.g., minimal text, few if any graphics and interactive elements, etc.) that can be appreciated by the user from the relatively far proximity.

Subsequent to the determining that the augmentable object is located at the first apparent proximity, processing facility 104 may determine that the augmentable object has come to be located at a second apparent proximity to the user. The second apparent proximity may be distinct from the first apparent proximity. For example, if the first apparent proximity was relatively far, the second apparent proximity may be relatively close (i.e., such that the augmentable object is relatively close to the user and hence is displayed on a relatively large portion of the field of view). In response to the determining that the augmentable object has come to be located at the second apparent proximity, processing facility 104 may replace, within the field of view, the first form of the overlay object with a second form of the overlay object distinct from the first form and tailored to the second apparent proximity. For example, if the first form of the overlay object was tailored to the first (relatively far) apparent proximity by being a relatively simple and basic form of the overlay object with minimal content, the second form of the overlay object may be tailored to the second (relatively close) apparent proximity by being a more detailed and/or complex form of the overlay object with a greater amount and/or different type of content (e.g., a larger amount of more meaningful text, a greater number of more detailed graphics and/or interactive elements, etc.) that can be appreciated by the user from the relatively close proximity.

Figure 2:
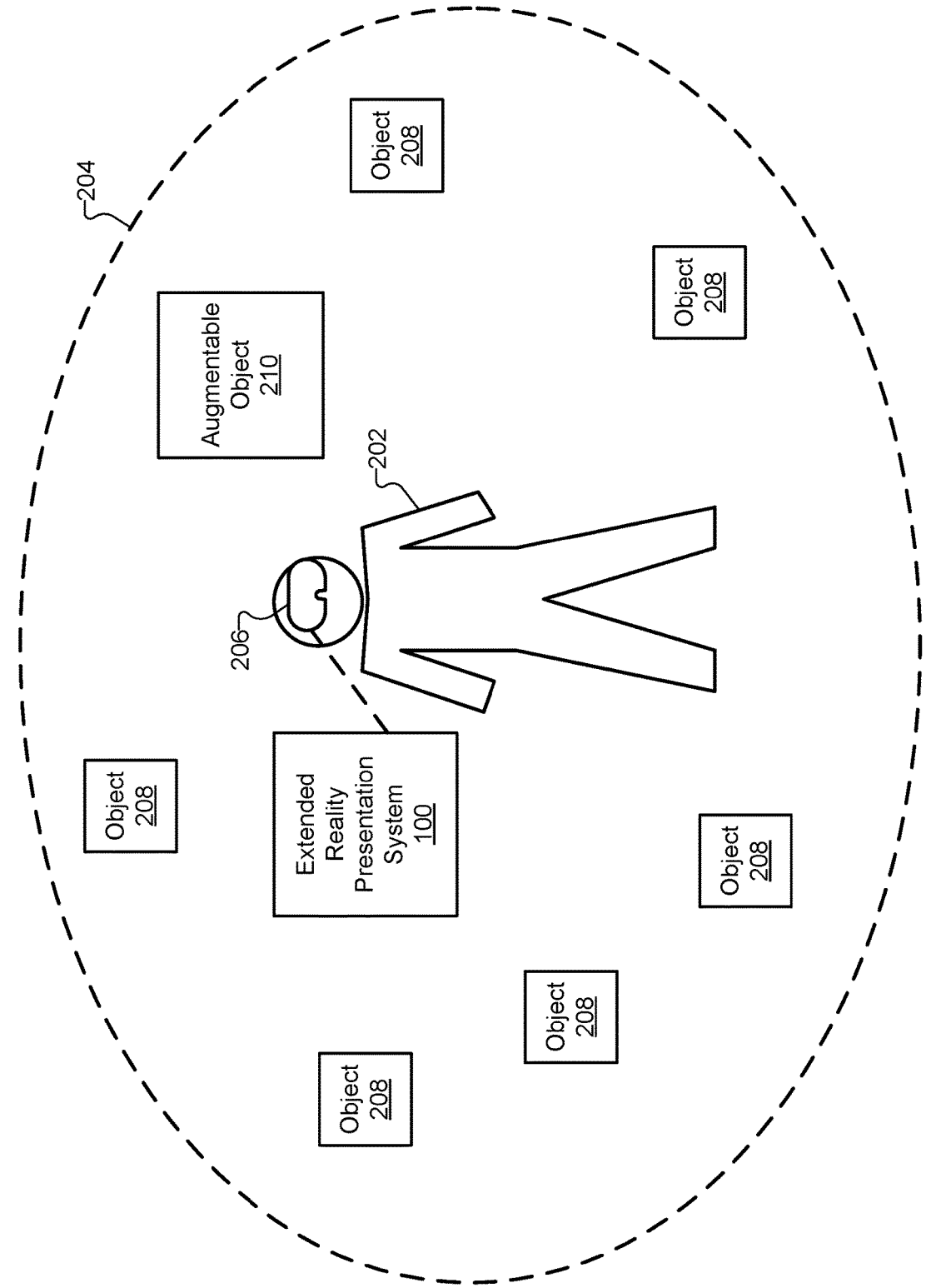
FIG. 2 illustrates an exemplary user experiencing an exemplary extended reality experience using the extended reality presentation system of FIG. 1 according to principles described herein.

FIG. 2 illustrates an exemplary user 202 experiencing an exemplary extended reality world 204 using system 100. Specifically, as shown, user 202 may view extended reality world 204 using a display screen 206 that is associated with (e.g., included as part of) system 100. Display screen 206 may present a field of view to user 202. Within the field of view, a set of objects of extended reality world 204 may be included. For instance, as illustrated, the set of objects may include one or more objects 208, some of which, such as an augmentable object 210, may be referred to as "augmentable objects." Each of these elements of FIG. 2 will now be described in more detail.

Extended reality world 204 may include or be implemented by any suitable type of world as may be experienced by user 202 using any suitable type of extended reality technology. For instance, in certain examples, system 100 may be implemented as a mixed reality presentation system and extended reality world 204 may comprise an augmented version of a real-world environment in which user 202 is located. In such mixed reality examples, objects 208 and 210 within extended reality world 204 may be actual real-world objects in the vicinity of user 202 in the real world that user 202 may view (e.g., through a transparent, semi-transparent or video pass-through implementation of display screen 206) as user 202 navigates his or her life in the real world. However, as will be described in more detail below, certain objects such as augmentable object 210 may also be augmented by system 100 (e.g., and by display screen 206, in particular) such that the objects appear different in extended reality world 204 than in the non-augmented real world user 202 would experience without system 100. Such mixed reality technology may be related to, similar to, or interchangeable with other technologies such as augmented reality technologies.

In other examples, system 100 may be implemented as a virtual reality presentation system and extended reality world 204 may comprise a virtual world that may be based on the real world (e.g., a real-world scene other than the real-world environment in which user 202 is located) or based on an imaginary or simulated world. In such virtual reality examples, objects 208 and 210 within extended reality world 204 may be virtual objects in the vicinity of user 202 in the virtual world presented to user 202 by an implementation of display screen 206 that is non-transparent and thereby fully controls the content presented to the eyes of user 202 during a virtual reality experience. As such, the virtual objects presented by display screen 206 may be based on real-world objects (e.g., real-world objects from a real-world scene being represented and that is distinct from the real-world environment in which user 202 is located) or simulated objects (e.g., virtualized objects from an imaginary virtual scene being represented). As will be described in more detail below, certain objects such as augmentable object 210 may also be augmented by system 100 (e.g., by display screen 206, in particular) such that the objects appear different in extended reality world 204 than in a non-augmented version of the world such as the real-world scene upon which extended reality world 204 may be based.

Display screen 206 may be any suitable type of display screen implemented using any suitable display or presentation technology, including technologies involving transparent or semi-transparent materials that allow light to pass through the display screen with little or no effect. In some examples, as shown in FIG. 2, display screen 206 may be implemented as a heads-up display screen that is mounted or worn on the head of user 202 so as to be presented directly in front of the eyes of user 202 even as user 202 turns his or her head to look in different directions and so forth. For instance, display screen 206 may be implemented as a pair of augmented reality glasses or contact lenses, or another suitable heads-up display that may or may not include a transparent or semi-transparent medium upon which content may be projected or otherwise displayed (e.g., a pixelated display screen, a light-field display screen, etc.). In these examples, display screen 206 may provide a view of one or more overlay objects integrated with the real-world environment within a field of view presented to user 202 by the heads-up display screen. For example, one or more overlay objects may be projected to replace (e.g., overlay) the view of an augmentable object such as augmentable object 210 or to be otherwise graphically associated therewith (e.g., by being overlaid onto content displayed adjacent to augmentable object 210, etc.).

In other examples, display screen 206 may be implemented by another type of display screen that is not a heads-up display screen (not explicitly shown in FIG. 2). For instance, display screen 206 may be a handheld display screen such as the display screen of a handheld mobile device (e.g., a smartphone, a tablet device, etc.), a stationary computer monitor, or another display screen as may serve a particular implementation. In these examples, display screen 206 may be opaque, rather than transparent or semi-transparent, but may likewise present overlay objects integrated with scenery from the extended reality world in a similar way.

Imagery of extended reality world 204 may be received, captured, and/or presented to user 202 in any manner as may serve a particular implementation of display screen 206. For instance, if display screen 206 is a transparent or partially transparent display screen, imagery representative of extended reality world 204 (and objects included therein) may be received and presented by light passing through the transparent or semitransparent medium of display screen 206 to the eyes of user 202. In contrast, if display screen 206 does not include a transparent or partially transparent display screen, but, instead, is an opaque screen, imagery of extended reality world 204 may be captured in real time by an imaging device (e.g., a camera) associated with system 100, may be received from another system (e.g., a three-dimensional ("3D") game server, etc.), or may be otherwise generated and/or received by system 100 in any suitable manner.

Objects 208 may represent any suitable set of objects that make up imagery visible in a field of view presented by display screen 206. In some examples, a plurality of objects will be presented in the field of view at the same time. For instance, if user 202 is waiting for a bus at a bus stop, the field of view presented by display screen 206 may include objects such as the street in front of the bus stop, vehicles driving on the street, buildings and landscaping (e.g., trees, shrubs, etc.) along the street, and so forth. Eventually, one object presented within the field of view in this example may be a bus that approaches and pulls up to the bus stop. At this point, the bus or another such large object may come so close as to fill the entirety of the field of view such that the "set of objects" presented in the field of view is, at least temporarily, a single-object set (e.g., that includes the bus as the only object in the set).

Among objects 208 in extended reality world 204, one or more augmentable objects such as augmentable object 210 may also be included. Augmentable objects will be understood to be a special category of objects that may be included within extended reality world 204 in the sense that augmentable objects may be recognized and treated differently from other objects by system 100. For example, any object in the extended reality world that system 100 is configured to recognize, identify, and/or augment (e.g., replace with an overlay object, present along with an overlay object, etc.) may be referred to herein as an augmentable object.

Depending on the nature of extended reality world 204 and the use case scenario within which system 100 is being used, objects 208 and augmentable object 210 may be implemented in various ways and by various types of objects. A few non-limiting examples of such use case scenarios will now be described.

In one use case scenario, objects 208 may be the street, vehicle, buildings, and landscaping around the bus stop described above, while augmentable object 210 may be the bus itself, which may be augmented with an overlay object that provides relevant information regarding the bus (e.g., the bus schedule, the bus route, an advertisement or offer associated with the bus, etc.).

Another use case scenario may involve personnel in a workplace (e.g., a factory, an office building, etc.). In this scenario, objects 208 may be various inanimate objects located around the workplace, while augmentable object 210 may be a specific person in the workplace. If user 202 is a manager on a factory floor, for instance, it may be desirable for user 202 to be able to locate specific people on the factory floor and to quickly gauge the personnel situation on the floor at a particular time. As such, each worker on the floor may be augmented with an overlay object relaying the identity of the worker and relevant information associated with the worker (e.g., when the worker's shift began and/or ends, what skills and/or preferences the worker has, etc.).

Still other use case scenarios may involve augmenting informational content (e.g., signs, advertisements, etc.) that exists in extended reality world 204. For instance, objects 208 may be vehicles on a highway and augmentable object 210 may be a road sign indicating a particular highway exit or the like. In this example, system 100 may augment the road sign to not only indicate an exit number and associated surface street, but to further indicate points of interest (e.g., restaurants, gas stations, etc.) that may be found if the exit is taken. Similarly, objects 208 may be buildings and objects along a street and augmentable object 210 may be a sign associated with a point of interest such as a restaurant, a store, a theater or concert venue, a sports venue, or the like. In these examples, the sign may be augmented to not only include the name of the point of interest, but to also provide other information such special menu items in the restaurant, sale items and offers in the store, shows and/or showtimes being presented at the theater, a score of a sporting event taking place at the sports venue, or the like.

While the above use case scenarios illustrate a few possibilities for how extended reality technologies may improve and facilitate the experience of user 202 in a few exemplary types of extended reality worlds, it will be understood that the methods and systems described herein for automatically tailoring a form of an extended reality overlay object may be employed in these and/or any various other suitable extended reality use case scenarios.

As mentioned above, system 100 and display screen 206 may be associated with one another in any suitable way. For instance, system 100 may include display screen 206 as one of multiple elements of system 100 (e.g., along with one or more non-head-mounted components of system 100) in certain examples, while computing components integrated into display screen 206 may fully or partially implement system 100 in other examples. In still other examples, system 100 may be separate from, but communicatively coupled with, display screen 206 such that system 100 may direct to some degree what is to be shown in the field of view of display screen 206.

Regardless of the relationship between system 100 and display screen 206, one or more sensors may be integrated with either or both of system 100 and display screen 206 for performing object identification tasks (e.g., identifying augmentable object 210 from the set of objects 208 in the field of view), movement tracking tasks (e.g., tracking augmentable object 210 as augmentable object 210 moves within the field of view), and so forth. For example, the one or more sensors may include image capture sensors (e.g., camera devices, etc.), locational or geolocational sensors (e.g., Global Positioning System ("GPS") sensors, etc.), motion sensors, smart tags, and so forth.

To illustrate various ways that system 100 may be implemented, FIG. 3 shows an exemplary configuration 300 within which system 100 may operate. Specifically, as shown in FIG. 3, user 202 may use display screen 206 to experience extended reality world 204 in the ways described above in relation to FIG. 2. However, whereas FIG. 2 illustrated system 100 as a single component associated with display screen 206 (e.g., built into display screen 206, communicatively coupled with display screen 206, etc.), configuration 300 shows more explicitly how system 100 may be distributed over one or more of an extended reality provider system 302, a network-edge-deployed server 306, and an extended reality presentation device 308 that may be communicatively coupled to one another by way of a network 304. Each element 302 through 308 will now be described in more detail as to the part that these elements may play in an implementation of system 100. However, it will be understood that, in any particular implementation of system 100, each of elements 302 through 308, as well as other elements not explicitly shown in configuration 300, may or may not be included or play a part in implementing the functionality of system 100 described herein.

Extended reality provider system 302 may be implemented by one or more computing devices or components managed and maintained by an entity that creates, generates, distributes, and/or otherwise provides extended reality media data representative of extended reality media content to users such as user 202. For example, extended reality provider system 302 may include or be implemented by one or more server computers maintained by an extended reality provider such as an extended reality content producer or distributer, a mobile carrier, an Internet service provider, or the like. Extended reality provider system 302 may provide any suitable extended reality data to extended reality presentation device 308 by way of network 304.

Network 304 may provide data delivery between server-side extended reality provider system 302 and client-side devices such as extended reality presentation device 308. In order to distribute extended reality data representative of extended reality media content from provider systems to client devices, network 304 may include a provider-specific wired or wireless network (e.g., a cable or satellite carrier network, a mobile telephone network, a traditional telephone network, a broadband cellular data network, etc.), the Internet, a wide area network, a local area network, a content delivery network, and/or any other suitable network or networks. Extended reality data may be distributed using any suitable communication technologies implemented or employed by network 304. Accordingly, data may flow between extended reality provider system 302 and extended reality presentation device 308 using any communication technologies, devices, media, and protocols as may serve a particular implementation.

Extended reality presentation device 308 may be implemented by any suitable type of device that may render and present any of the types of extended reality media content described herein. For instance, extended reality presentation device 308 may be implemented as a wearable, portable, or handheld extended reality viewing device integrated with display screen 206 (e.g., a smart glasses device, a smart contact lenses device, a smartphone, a tablet computer, a laptop computer, etc.), a portable or more stationary device that couples with display screen 206 (e.g., a television device, a desktop computer, a home automation device, etc.), or any other device as may serve a particular implementation. In certain examples, extended reality presentation device 308 may be configured to provide, for user 202, any of the extended reality experiences described herein.

Network-edge-deployed server 306 may be implemented at an edge of network 304 by one or more servers and/or other suitable computing systems or resources that may each interoperate with extended reality presentation device 308 with a low enough latency to stand in for computing elements that might otherwise be physically integrated with extended reality presentation device 308. To this end, network-edge-deployed server 306 may communicate with extended reality presentation device 308 by way of an ultra-low latency communication connection that may leverage Mobile-Edge Computing or Multi-Access Edge Computing ("MEC") technologies, 5G cellular technologies, and so forth to enable computing capabilities at the edge of network 304. While network-edge-deployed server 306 may be integrated with various components of a cellular network or the like included within network 304, it will be understood that, in certain examples, network-edge-deployed computing resources implementing network-edge-deployed server 306 may be more localized to extended reality presentation device 308. For instance, certain implementations of network-edge-deployed server 306 may be implemented by computing resources on a same local area network with extended reality presentation device 308 (e.g., by computing resources located within a home or office of user 202 such as a router with a fiber optic connection to network 304, etc.).

Each of elements 302 through 308 may perform any suitable roles in a particular embodiment of system 100 in order to facilitate system 100 in operating as described herein. For example, in one implementation, the extended reality presentation device 308 could perform by itself the functionality to present the field of view to user 202; perform with real-time assistance from network-edge-deployed server 306 the functionality to identify the augmentable object within the field of view and determine that the augmentable object is located at the first apparent proximity; perform the presenting of the first form of the overlay object based on an overlay object provided by extended reality provider system 302; and perform alone or with assistance from network-edge-deployed server 306 the determining that the augmentable object has come to be located at the second apparent proximity and the replacing of the first form of the overlay object with the second form of the overlay object within the field of view.

System 100 may be configured to perform "marker-based" extended reality object augmentation in the sense that augmentations to augmentable objects (e.g., overlay objects graphically associated with the augmentable objects) are displayed at an area marked or designated by the presence of the augmentable object, rather than, for example, at an area that is not so designated. Consequently, as a particular augmentable object moves and changes within the field of view (e.g., by moving with respect to display device 206 and user 202), an overlay object graphically associated with the augmentable object may be configured to change in accordance with the way that the augmentable object is presented in the field of view.

As used herein, an "overlay object" may refer to any virtual object that system 100 may display or cause to be displayed in association with the view of an augmentable object. For instance, an overlay object may be graphically associated with the augmentable object by being overlaid onto the augmentable object (e.g., presented in place of or on top of a limited target area or an entirety of the augmentable object in the field of view) or by being displayed adjacent to the augmentable object in such a way that the association between the augmentable object and the overlay object is made apparent (e.g., due to an arrow or other such graphical connection being depicted to associate the augmentable and overlay objects with one another).

Various overlay objects described herein are shown and described to take different "forms" based on various factors and circumstances (e.g., based on the apparent proximity of augmentable objects to which the overlay objects correspond). As used herein, a "form" of an overlay object may refer to the content, format, appearance, arrangement, or other such aspects of the overlay object as these aspects are presented at a particular time. For instance, as will be described and illustrated in more detail below, one form of an overlay object may present certain content having a particular format, appearance, and arrangement, while another form of the overlay object may present different content, additional content, the same or similar content (e.g., having a different format, appearance, or arrangement than presented by the first form), or any other content that may or may not be directly related to the content presented by the first form of the overlay object. As such, while different forms of an overlay object corresponding to an augmentable object are referred to herein, it will be understood that each form of a given overlay object may alternatively be conceptualized as a separate overlay object that corresponds with the same augmentable object. For example, a first form and a second form of a particular overlay object corresponding to a particular augmentable object may be implemented by, or conceptualized as, a first overlay object and a second overlay object that both correspond to the particular augmentable object and are configured to replace one another so that only one of the first and second overlay objects is presented at any particular time.

To illustrate overlay objects and certain graphical associations of overlay objects with augmentable objects as the augmentable objects move within a field of view, FIGS. 4A through 4D depict a field of view 402 into an extended reality world. As shown, field of view 402 is referenced as fields of view 402-A through 402-D in FIGS. 4A through 4D, respectively, for convenience in referring to the different views provided by the different figures. The extended reality world into which fields of view 402 provide a view may be understood to be extended reality world 204 or any other suitable extended reality world described herein or as may serve a particular implementation. Thus, as shown, the extended reality world may include several objects 208 (e.g., a triangular prism object and a cylinder object that may be representative of any of objects 208 described above), as well as at least one augmentable object 210 (e.g., represented as a cube object in FIGS. 4A through 4D and representative of any augmentable object described herein).

As shown, different forms of different overlay objects are graphically associated with augmentable object 210 in the different fields of view 402. Specifically, a single form 404 of an overlay object is shown to be graphically associated with augmentable object 210 in both fields of view 402-A and 402-B, thereby illustrating a conventional manner of presenting an overlay object with an augmentable object. In contrast, different forms 406-1 and 406-2 of the overlay object are shown to be graphically associated with augmentable object 210 in fields of view 402-C and 402-D, thereby illustrating how methods and systems described herein may be configured to automatically tailor the form of overlay objects based on an apparent proximity of augmentable object 210.

For any of fields of view 402, system 100 may be configured to analyze the set of objects presented in the field of view (e.g., including objects 208 and 210) so as to identify object 210 as an augmentable object. This identifying of augmentable object 210 may be performed in any suitable manner. For example, system 100 may use computer vision, machine learning, object recognition, artificial intelligence, and/or any other suitable technologies or techniques to analyze each object and determine that object 210 is a recognizable augmentable object. Additionally, in certain implementations, bar codes, QR codes, or other readily recognizable symbols or objects may be used to facilitate the analysis and identification of augmentable objects.

As described above in relation to FIG. 3, external resources apart from system 100, or at least apart from the extended reality presentation device hardware associated with the user, may provide data and/or processing resources to assist system 100 in identifying augmentable object 210. As one example, an extended reality provider system integrated with or communicatively coupled with system 100 may provide data indicative of augmentable objects that system 100 is to attempt to identify in the field of view. As another example, a network-edge-deployed server integrated with or communicatively coupled with system 100 may provide processing resources to facilitate the analysis of all the objects in the field of view as system 100 attempts to identify augmentable object 210.

Once augmentable object 210 is identified as an augmentable object, system 100 may track augmentable object 210 as the object moves in the field of view (e.g., based on movement of the object, movement of the point of view of user 202 such as indicated by head turns of user 202, or a combination of both of these and/or other types of movement in the extended reality world). For instance, as the proximity between user 202 and augmentable object 210 decreases (i.e., as augmentable object 210 and user 202 get closer to one another), system 100 may track augmentable object 210 as augmentable object 210 grows larger in the field of view. This is illustrated by the difference between the size of augmentable object 210 in FIGS. 4A and 4B (i.e., augmentable object 210 is understood to be closer to user 202 in field of view 402-B because the size of augmentable object 210 is greater than in field of view 402-A), as well as by the difference between the size of augmentable object 210 in FIGS. 4C and 4D (i.e., augmentable object 210 is understood to be closer to user 202 in field of view 402-D because the size of augmentable object 210 is greater than in field of view 402-C).

As system 100 tracks augmentable object 210 (or, alternatively, as system 100 continually reanalyzes and reidentifies augmentable object 210), system 100 may determine that augmentable object 210 is located at a second apparent proximity. For example, in FIGS. 4A and 4C, the first apparent proximity of augmentable object 210 is shown to be a relatively far apparent proximity, while in FIGS. 4B and 4D, the second apparent proximity of augmentable object 210 is shown to be a relatively close apparent proximity.

Figure 4A:
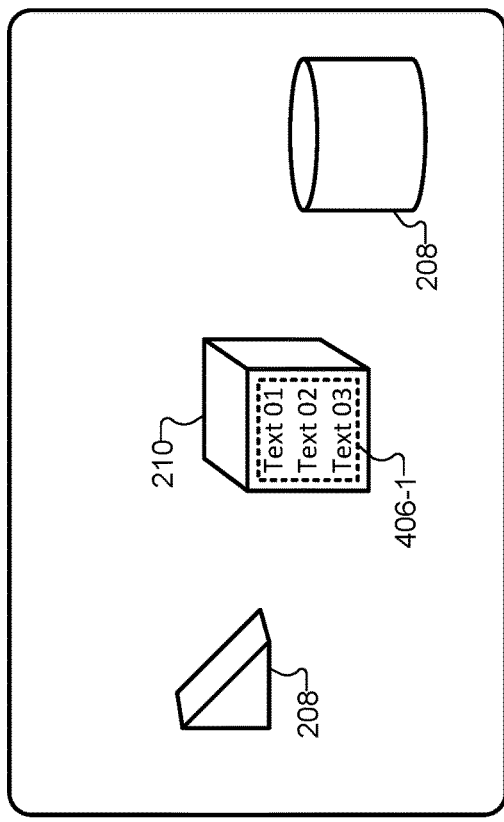
FIGS. 4A-4D illustrate exemplary fields of view into an extended reality experience that includes a set of objects comprising an augmentable object with which different forms of different overlay objects are graphically associated according to principles described herein.
Figure 4C:
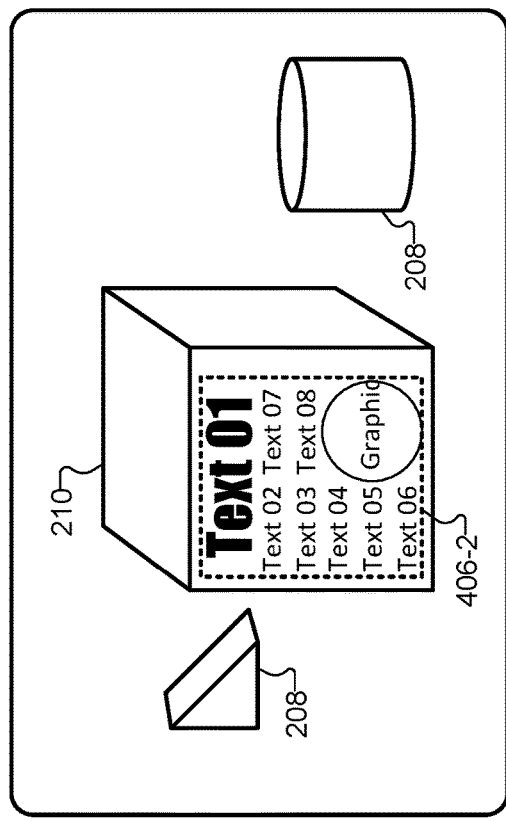
Figure 4B:
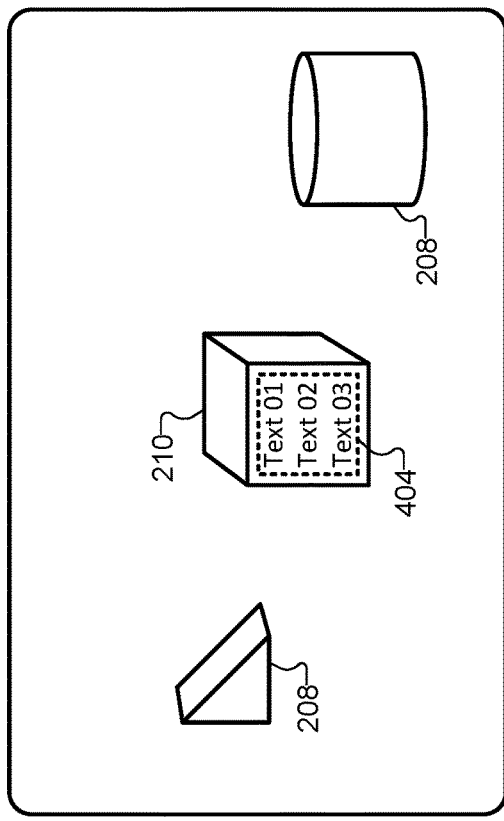

In some examples, both the first and second apparent proximity may satisfy or fail to satisfy a particular predetermined proximity threshold, as will be described in more detail below. As such, a form of the overlay object may be tailored to proximities in the range of the first and second apparent proximities, but the same form of the overlay object may be employed for both apparent proximities. To illustrate, FIG. 4A illustrates augmentable object 210 at a first (relatively far) apparent proximity to user 202 and FIG. 4B illustrates augmentable object 210 at a second (relatively close) apparent proximity to user 202. Because neither the first nor the second apparent proximity happens to satisfy a predetermined proximity threshold that the other fails to satisfy, the same form 404 of the overlay object (i.e., a form that includes three lines of text labeled Text 01 through Text 03) is graphically associated with augmentable object 210 in both fields of view 402-A and 402-B. As mentioned above, the same effect may be observed when no predetermined proximity threshold exists, such as may be the case with conventional implementations of extended reality technology.

It is noted that, as shown, the overlay object graphically associated with augmentable object 210 in field of view 402-A is not identical to the overlay object overlaid onto augmentable object 210 in field of view 402-B. Specifically, because the overlay object is configured to reorient and scale in accordance with movements of augmentable object 210 within the field of view, the overlay object shown in FIG. 4A is significantly smaller than the overlay object shown in FIG. 4B. However, it is also noted that, despite any such change in scale or orientation to the overlay object caused by motion of augmentable object 210 relative to the point of view of user 202, form 404 of the overlay object does remain identical in FIGS. 4A and 4B. That is, both overlay objects show the same content (i.e., the same three lines of text in this example) with the same format, appearance, arrangement, etc., in both FIGS. 4A and 4B.

Figure 4D:
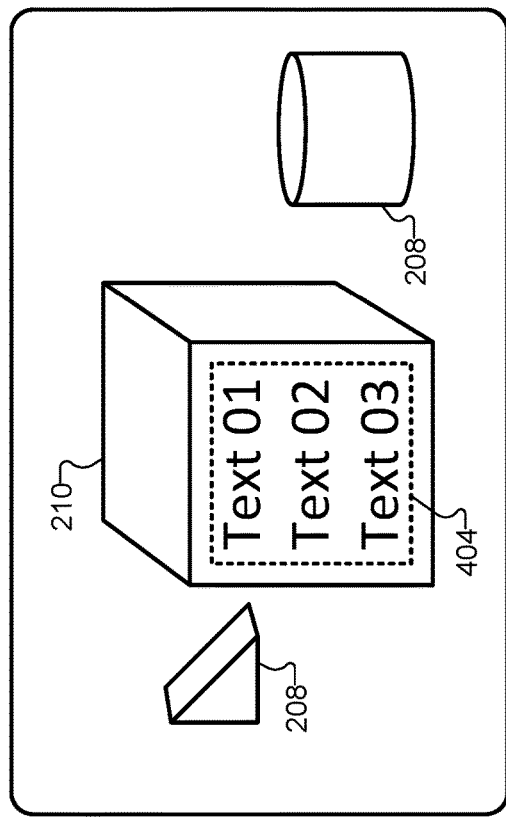

In contrast, in other examples, one of the first and second apparent proximities may satisfy a particular predetermined proximity threshold that the other fails to satisfy. For example, the first apparent proximity may satisfy a predetermined proximity threshold that the second apparent proximity fails to satisfy, or the first apparent proximity may fail to satisfy a predetermined proximity threshold that the second apparent proximity satisfies. In these examples, the form of the overlay object may not only be tailored to the appropriate proximity (e.g., by optimizing an amount of detail or content that may be appreciated by the user given his or her proximity to the augmentable object), but different forms of the overlay object may be employed for each apparent proximity. To illustrate, FIG. 4C illustrates augmentable object 210 at the same first (relatively far) apparent proximity shown in FIG. 4A, while FIG. 4D illustrates augmentable object 210 at the same second (relatively close) apparent proximity shown in FIG. 4B. In this example, because one of the first or second apparent proximities happens to satisfy a predetermined proximity threshold that the other fails to satisfy, one form 406-1 of the overlay object (i.e., a form that includes the three lines of text labeled Text 01 through Text 03) is graphically associated with augmentable object 210 in field of view 402-C, and a different form 406-2 of overlay object (i.e., a form that includes eight lines of text labeled Text 01 through Text 08 and a graphic labeled "Graphic") is graphically associated with augmentable object 210 in field of view 402-D.

It is noted that, as shown, the overlay object graphically associated with augmentable object 210 in field of view 402-C is distinct from the overlay object graphically associated with augmentable object 210 in field of view 402-D. However, in contrast to the distinction described above in relation to fields of view 402-A and 402-B (i.e., where the distinction of the overlay object was one of scale and/or orientation only), the distinction of the overlay object in fields of view 402-C and 402-D is not only one of scale and/or orientation, but is also a distinction of form. As mentioned above, the form of an overlay object may refer to various aspects of the content, format, appearance, or arrangement of the overlay object. However, it will be understood that overlay object instances corresponding to the same augmentable object and differing only in scale and/or orientation (e.g., according to the scale and orientation of the augmentable object) will be considered herein to be the same form of the same overlay object. Accordingly, as used herein, a second form of an overlay object may be said to be distinct from a first form of the overlay object when the second form includes different content than the first form (e.g., different or more text, a different graphic, a more detailed or higher-resolution graphic, an interactive link that was not present on the first form, etc.); the second form includes a different type of content than the first form (e.g., a video rather than a still image, an interactive text link in place of non-interactive text, etc.); the second form includes a different design than the first form (e.g., a different font, a different size of text and/or graphics relative to one another, etc.); the second form is a different size with respect to the augmentable object than the first form; the second form is graphically associated with the augmentable object in a different manner than the first form (e.g., the second form is directly overlaid onto the augmentable object rather than displayed adjacent to the augmentable object, etc.); or the second form is otherwise different from the first form in a combination of these ways or in a similar manner.

In some examples, content included in two different forms of an overlay object may be similar in theme or in the information being presented, even if the content is not identical. In certain examples, content in different forms of an overlay object may even overlap by, for instance, including certain common textual content (e.g., the same title, etc.), including a common graphic (e.g., the same logo, etc.), or the like. In other examples, content in different forms of an overlay object may be unrelated and completely different. For instance, one form of the overlay object may include only text, while another form of the overlay object may include only a graphic, or different text than the first form. In this sense, as mentioned above, the two forms of the overlay object may be conceptualized as two completely distinct overlay objects each corresponding to the same augmentable object and configured to be presented in conjunction with the augmentable object at different times or under different circumstances.

The distinctions between forms 406-1 and 406-2 shown in FIGS. 4C and 4D illustrate a few of these differences that render first and second forms of an overlay object distinct from one another. Specifically, as shown, form 406-1 is depicted to have three lines of text that are all the same size, while form 406-2 is depicted to have one line of text ("Text 01") that is notably larger than the others, like a title. Moreover, while form 406-1 is limited to three lines of text due to being tailored to the relatively small size of augmentable object 210 in field of view 402-C, form 406-2 includes eight lines of text and a graphic due to being tailored to the relatively large size of augmentable object 210 in field of view 402-D.

As fields of view 402-A and 402-B in FIGS. 4A and 4B illustrate, it may be beneficial for the overlay object to change and adapt in accordance with the changing of augmentable object 210 within the field of view. For example, due to the automatic adaptation of the overlay object of form 404, a strong sense of connection between the overlay object and augmentable object 210 may be made in the mind of user 202 because the overlay object is made to appear to be projected onto augmentable object 210 in the same way regardless of how augmentable object 210 changes within the field of view. As beneficial as this may be, however, it may not be particularly useful for the same three lines of text used when augmentable object 210 has a relatively far apparent proximity such as illustrated by FIG. 4A (e.g., lines of text that can be appreciated by the user even when augmentable object 210 is far away) to also be displayed when augmentable object 210 has a relatively close apparent proximity such as illustrated by FIG. 4B. For example, the text displayed in the overlay object of field of view 402-B may be so large as to be difficult for user 202 to read (e.g., requiring user 202 to move his or her head rather than scanning with the eyes to read, etc.), or at least may be an inefficient use of the visual field that user 202 is provided.

To remedy this potential inefficiency, system 100 may thus be configured to use different forms 406 of an overlay object, as shown in FIGS. 4C and 4D. Rather than projecting the same three lines of text that made sense to display in form 406-1 of the overlay object, system 100 may project a more detailed, helpful, and tailored form of the overlay object for the relatively close proximity of augmentable object 210 shown in field of view 402-D. As such, FIG. 4D shows that a much greater amount of text may be included within the overlay object, as well as a graphic. In this way, the visual field of user 202 may be used more efficiently than in the example of FIGS. 4A and 4B to provide an appropriate level of detail related to augmentable object 210 based on the apparent proximity of augmentable object 210.

While form 406-2 of the overlay object shown in field of view 402-D shows a few different types of textual and graphical elements that may be appropriate for a form of an overlay object that is tailored to the relatively close apparent proximity of augmentable object 210 in FIG. 4D, it will be understood that these elements are exemplary only, and that any suitable textual, graphical, or other elements may be employed as may serve a particular implementation. For example, along with two-dimensional ("2D") or 3D text of different sizes and 2D or 3D graphics featuring still images, animated images, and/or videos, certain forms of a particular overlay object may further include interactive elements (e.g., hyperlinks, user interface buttons that may be selected by user 202, etc.), real-time data elements (e.g., charts, graphs, etc.), audio elements, and/or any other suitable elements as may serve a particular implementation. Additionally, certain forms of an overlay object may include or implement a 2D or 3D model of a virtual object (e.g., an animated character, an item for purchase in an advertisement, etc.). As yet another example, certain implementations of system 100 may incorporate hardware transducers for generating physical feedback (e.g., haptic feedback, etc.). For example, system 100 may include an eccentric rotating mass motor, a linear resonant actuator, a piezoelectric actuator, or the like. In these implementations, certain forms of the overlay object may also include haptic elements or other such elements configured to provide physical feedback and interaction to the user as may serve a particular implementation.

Moreover, it will be understood that the level of detail of information presented in different forms of an overlay object may also change and be tailored to the apparent proximity of the augmentable object with which the overlay object is associated. For example, if augmentable object 210 is a bus, form 406-1 of the overlay object may indicate only basic information such as the route number and direction of travel of the bus, while form 406-2 of the overlay object may indicate the basic information together with more detailed information such as the information about the next several stops, a map graphic illustrating the route, and so forth. As another example, if augmentable object 210 is a worker in a factory, form 406-1 of the overlay object may indicate only basic information such as the name and job title of the worker, while form 406-2 of the overlay object may indicate this same information together with additional details such as when the worker's current shift began and will end, what special skills the worker may have, a picture of the worker, and so forth.

Referring to the different forms 406-1 and 406-2 of the overlay object shown in FIGS. 4C and 4D, it will be understood that the replacing of form 406-1 with form 406-2 may be performed in any suitable way. For instance, in certain implementations, as soon as a predetermined proximity threshold is satisfied, form 406-2 may be made to instantly be shown in place of form 406-1 within the field of view. In other implementations, the replacement may be made more gradually after the predetermined proximity threshold is detected to be satisfied. As one example, form 406-1 may fade or transition into form 406-2 gradually using any suitable video transition or effect as may serve a particular implementation. As another example, one or more new lines of text or new graphics may be added one at a time to form 406-1 as space becomes available on the overlay object (e.g., as augmentable object 210 comes closer and grows in size) until all of the elements of form 406-2 are in place.

Regardless of the manner in which a more complex form of an overlay object such as form 406-2 replaces a simpler form of the overlay object such as form 406-1, system 100 may tailor the form of the overlay object and determine when to replace one form of the overlay object with another based on an apparent proximity of the augmentable object with which the overlay object is associated. In the example of FIGS. 4C and 4D, for instance, system 100 may tailor forms 406-1 and 406-2 of the overlay object, as well as determine when form 406-2 is to replace form 406-1 (or vice versa), based on the apparent proximity of augmentable object 210 to the user viewing augmentable object 210 in field of view 402.

As used herein, an apparent proximity of an augmentable object to a user refers to how close to or far away from the user the augmentable object appears to be. For instance, an augmentable object that appears to be relatively near to the user (e.g., and is thus relatively large within a field of view being viewed by the user) may be said to be in relatively close apparent proximity to the user. In contrast, an augmentable object that appears to be relatively far away from the user (e.g., and is thus relatively small within the field of view) may be said to be in relatively far apparent proximity to the user.

In some implementations, the apparent proximity of an augmentable object to a user may be assumed to relate to or correspond with an actual proximity of the augmentable object to the user. As such, in these implementations, system 100 may determine the apparent proximity of the augmentable object to the user by determining the distance from the user to the augmentable object. For example, system 100 may determine the distance from the augmentable object to an extended reality presentation device used by the user (e.g., extended reality presentation device 308 including display screen 206, which may be presenting the field of view to user 202). This distance may be determined in any suitable way, such as by employing a suitable depth capture technique like a stereoscopic depth capture technique (e.g., calculating the distance based on the displacement of the augmentable object in imagery captured by two different capture devices having a precalibrated relationship with one another), a time-of-flight depth capture technique (e.g., a time-of-flight camera, a laser range finder, a radar device, etc.), a depth capture technique employing computer-vision-based estimation, or any other suitable depth capture technique as may serve a particular implementation.

In other implementations, the apparent proximity of the augmentable object to the user may not necessarily be assumed to relate to or correspond with the actual proximity of the augmentable object to the user. As such, in these implementations, system 100 may not at any point positively determine a distance from the user to the augmentable object. Instead, system 100 may determine the apparent proximity of the augmentable object to the user by determining a total portion (e.g., a percentage, etc.) of the field of view upon which the augmentable object is displayed and using a value representative of this portion as the apparent proximity. It will be understood that this apparent proximity value is a proxy for the actual proximity and may or may not perfectly correspond to the actual proximity of the augmentable object to the user at all times (e.g., based on the geometry of the object, the orientation of the object with respect to the viewpoint of the user, etc.). However, because the portion of the field of view may be a fair approximation of the actual proximity of the augmentable object and an approximation that is convenient and inexpensive to determine (e.g., inexpensive both in terms of processing requirements and special sensors required by the extended reality presentation device), the portion of the field of view may serve as a convenient and useful proxy for the actual proximity in implementations where the actual proximity is not determined.

In these examples, system 100 may determine that augmentable object 210 is located at a first apparent proximity to user 202 by determining that augmentable object 210 is displayed by a first portion of field of view 402. For instance, the first portion of field of view 402 may be associated with a first percentage of a totality of field of view 402. Subsequently, system 100 may determine that augmentable object 210 has come to be located at the second apparent proximity to user 202 by determining that augmentable object 210 has come to be displayed by a second portion of field of view 402 (e.g., a different portion of field of view 402 than the first portion). For instance, the second portion may be associated with a second percentage of the totality of field of view 402 that is distinct from the first percentage.

Figure 5A:
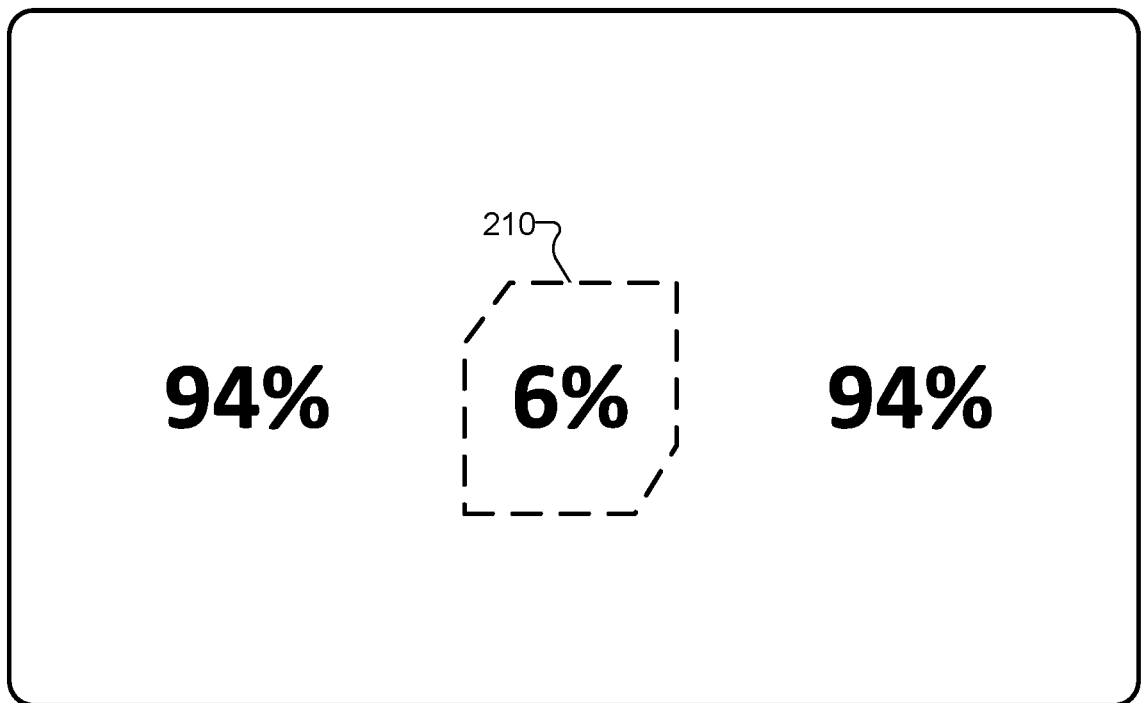
FIGS. 5A-5B illustrate exemplary portions of exemplary fields of view according to principles described herein.
Figure 5B:
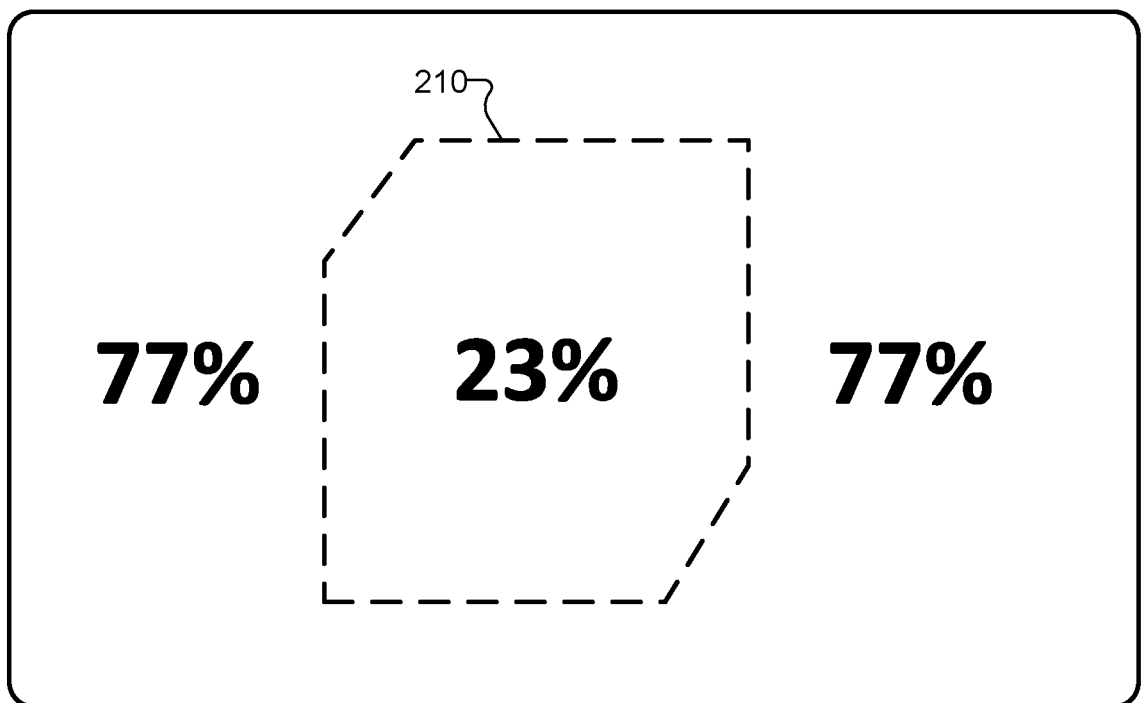

To illustrate, FIGS. 5A and 5B show exemplary portions of an exemplary field of view 502 (e.g., referenced, for convenience, as field of view 502-A in FIG. 5A and field of view 502-B in FIG. 5B). As illustrated in FIG. 5A, an outline of augmentable object 210 is depicted in field of view 502-A to have an apparent proximity corresponding to the apparent proximity of augmentable object 210 in field of view 402-C in FIG. 4C above. As shown, this apparent proximity may correspond to a portion of about 6% of the totality of field of view 502-A, leaving 94% of the field of view to display other elements of the extended reality world (e.g., other objects 208 and so forth, which are not explicitly shown in field of view 502). Moreover, as illustrated in FIG. 5B, an outline of augmentable object 210 is depicted in field of view 502-B to have an apparent proximity corresponding to the apparent proximity of augmentable object 210 in field of view 402-D in FIG. 4D above. As shown, this apparent proximity may correspond to a portion of about 23% of the totality of field of view 502-B, leaving 77% of the field of view for displaying other elements.

The portion of the field of view used to display augmentable object 210 may be determined in any suitable way. For instance, if display screen 206 upon which field of view 502 is displayed is a display screen that includes a total number of pixels, a number of pixels used to display augmentable object 210 may be divided by the total number of pixels to determine a percentage of the pixels associated with augmentable object 210 at a particular point in time. As shown, this percentage may be approximately 6% for the point in time represented by field of view 502-A and approximately 23% for the point in time represented by field of view 502-B. In other examples, display screen 206 may employ display technology that relies on non-pixelated image projection and thus may not be associated with pixels as such. In these examples, similar principles adapted to the display technology may be employed to similarly determine the overall percentage of the usable display space that the depiction of augmentable object 210 takes up.

While the orientation of augmentable object 210 remains the same in FIGS. 5A and 5B, it will be understood that a change in orientation of augmentable object 210 could affect the apparent proximity determined in this manner (i.e., the total portion of field of view 502 used to display augmentable object 210) even if the actual proximity remained unchanged. For example, at the actual proximity of augmentable object 210 shown in field of view 502-B, augmentable object 210 may be oriented to use more or less than the 23% portion shown by being turned and reoriented, rather than only by moving closer or farther away. Even still, as mentioned above, it will be understood that the percentages shown may provide a suitable and easily determinable proxy value to represent the actual proximity, and may thus be used as apparent proximity values in various implementations. Additionally, in certain examples, system 100 may attempt to account for variances in orientation by estimating, for example, what portion of field of view 502 a particular face of augmentable object 210 would use if augmentable object 210 were reoriented in a different way (e.g., in a standardized way, in a way corresponding to how the object was oriented at a previous point in time, etc.).

In some examples, an overlay object associated with a particular augmentable object such as augmentable object 210 may have several different forms associated with several different apparent proximities (or ranges of apparent proximities) of the augmentable object to the user. To determine which form of the overlay object is to be used for any given apparent proximity, one or more predetermined thresholds or ranges may be defined with respect to the apparent proximity. Such thresholds may be referred to herein as "proximity thresholds," and may separate different apparent proximities measured in any manner described herein (e.g., measured as actual distances, measured as percentage values of the totality of the field of view, etc.).

System 100 may determine which of several forms of an overlay object to use for an augmentable object at a first apparent proximity (e.g., the apparent proximity of 6% illustrated in FIG. 5A) by determining that the apparent proximity satisfies or fails to satisfy one or more predetermined proximity thresholds. For instance, the first apparent proximity of 6% may be determined to satisfy a predetermined proximity threshold defined to be 5% of the totality of the field of view, but not to satisfy a predetermined proximity threshold of defined to be 20% of the totality of the field of view. Subsequently, system 100 may be configured to determine that a second apparent proximity (e.g., the apparent proximity of 23% illustrated in FIG. 5B) satisfies both of these exemplary 5% and 20% proximity thresholds. As a result, system 100 may display a second form of the overlay object for the second apparent proximity instead of the first form used for the first apparent proximity. For example, the replacing of the first form of the overlay object with the second form of the overlay object may be performed in response to determining that the second apparent proximity satisfies the predetermined proximity threshold that the first apparent proximity failed to satisfy (i.e., the 20% proximity threshold).

Proximity thresholds may be defined to be any suitable type of thresholds based on any suitable factors. For example, in implementations where pixelated screens are used to present overlay objects and apparent proximity is measured based on a value related to the number of pixels used to represent the augmentable object and/or the associated overlay object, proximity thresholds may be defined based on numbers or percentages of pixels. For instance, it may be determined that a certain number of pixels (e.g. 1000 pixels) is needed at a minimum for an overlay object to include legible text, so a proximity threshold may be defined to require an augmentable object to have an apparent proximity at least close enough for that number of pixels to be used to display the overlay object. As another example, a minimum percentage value of the field of view (e.g., 1% of the field of view) may be determined for an augmentable object to be recognizable, for an overlay object to be appreciable, or the like. As such, a proximity threshold may be defined to require the augmentable object and/or the overlay object to be displayed using at least that minimum percentage value. In other examples (e.g., implementations that do not use pixelated screen technologies, implementations that define apparent proximities based on determination of actual distances, etc.), proximity thresholds may be defined in other suitable ways.

In some examples, one or more proximity thresholds may be defined to create one or more ranges with which different forms of the overlay object may be associated. For instance, in one example, a first proximity threshold may be defined at a first value (e.g., 1% of the totality of the field of view) to create a first apparent proximity range (e.g., 0%-1% of the field of view), a second proximity threshold may be defined at a second value (e.g., 5% of the field of view) to create a second apparent proximity range (e.g., 1%-5% of the field of view), a third proximity threshold may be defined at a third value (e.g., 20% of the field of view) to create a third apparent proximity range (e.g., 5-20% of the field of view), and a fourth proximity threshold may be defined at a fourth value (e.g., 35% of the field of view) to create a fourth apparent proximity range (e.g., 20%-35% of the field of view) and a fifth proximity range (e.g., 35%-100% of the field of view). As the apparent proximity of an augmentable object changes and moves between these different proximity ranges during the course of an extended reality session, system 100 may use different forms of the overlay object that are associated with each range.

To illustrate, FIGS. 6A through 6D show various exemplary forms 406 (e.g., forms 406-0 through 406-3) of an overlay object graphically associated with augmentable object 210 as augmentable object 210 moves to different exemplary apparent proximities to user 202. For clarity of description, the four exemplary proximity thresholds described above (e.g., 1%, 5%, 20%, and 35%) and the five exemplary proximity ranges described above (e.g., 0%-1%, 1%-5%, 5%-20%, 20%-35%, and 35%-100%) will be referred to in the following description of a field of view 602 that is illustrated at different points in time as the apparent proximity of augmentable object 210 changes (e.g., referenced as field of view 602-A in FIG. 6A, field of view 602-B in FIG. 6B, field of view 602-C in FIG. 6C, and field of view 602-D in FIG. 6D). However, it will be understood that the number of proximity thresholds and ranges, the types of proximity thresholds and ranges (e.g., based on field of view percentages rather than numbers of pixels, actual distances, or other characteristics), and the values of the proximity thresholds and ranges are all provided only as examples for the purpose of illustration. In various implementations, any number, type, value, or other characteristic may be used to define suitable proximity thresholds and/or corresponding proximity ranges as may serve a particular implementation. For example, in certain implementations, only a minimum threshold and a maximum threshold may be defined so as to create three ranges: a first range where the form of the overlay object is a static size (e.g., a static scale) larger than a relatively small depiction of the augmentable object within the field of view (e.g., similar to the depiction in FIG. 6A), a second range where the form of the overlay object is configured to mimic the dynamic size (e.g., the dynamic scaling) of the augmentable object (e.g., similar to the depiction in either FIG. 6B or 6C), and a third range where the form of the overlay object is a static size smaller than a relatively large depiction of the augmentable object within the field of view (e.g., similar to the depiction in FIG. 6D).

When the apparent proximity of augmentable object 210 is such that the first proximity threshold is not satisfied (e.g., when augmentable object 210 is displayed using between 0% and 1% of field of view 602), no form of the overlay object may be shown at all in certain examples. In this situation, system 100 may not even be able to positively identify augmentable object 210 or distinguish it from other objects within the extended reality world. This situation is not explicitly shown in any of FIGS. 6A through 6D.

Figure 6A:
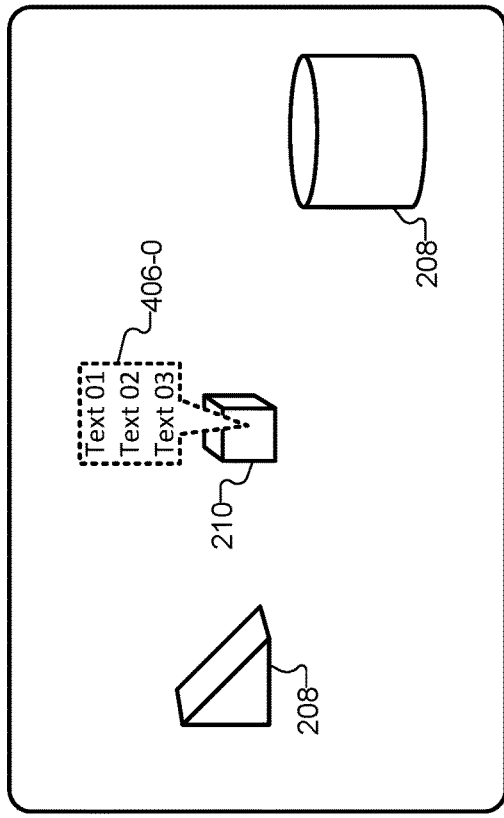
FIGS. 6A-6D illustrate various exemplary forms of an overlay object graphically associated with an augmentable object as the augmentable object moves to different apparent proximities to a user according to principles described herein.

However, when the apparent proximity of augmentable object 210 changes such that the first proximity threshold is satisfied (e.g., when augmentable object 210 is displayed using between 1% and 5% of field of view 602), a first form 406-0 of the overlay object may be presented, as illustrated in field of view 602-A in FIG. 6A. As shown, form 406-0 is a minimal form that is statically scaled (e.g., at a minimum size where the text is legible or the content of the overlay object is otherwise appreciable to the user) so as not to change in scale based on the apparent proximity of augmentable object 210. In some examples, as soon as augmentable object 210 can be positively identified or recognized as being an augmentable object, the first proximity threshold may be considered to be satisfied, while in other examples, the apparent proximity may be required to meet a specific threshold as described above.

When augmentable object 210 is relatively far away and displayed on a relatively small portion of field of view 602 (as shown in field of view 602-A), system 100 may recognize the object but may not yet be able to positively identify particular details or characteristics of augmentable object 210. For example, at this stage, system 100 may recognize augmentable object 210 as a bus, but may not yet be able to identify which bus it is so as to associate the bus with a particular route or the like. As another example, system 100 may recognize augmentable object 210 as a person (or, more specifically as a factory floor worker), but may not yet be able to identify who the person is so as to associate the person with a particular work shift or skill set or the like. Accordingly, the content displayed in form 406-0 of the overlay object may include fewer details or less information than other forms 406 of the overlay object that will be described in more detail below.

Additionally, when statically-scaled form 406-0 is being graphically associated with augmentable object 210 and when a target area of augmentable object 210 (i.e., an area or portion of augmentable object 210 upon which the overlay object would normally be displayed) is smaller than form 406-0, form 406-0 of the overlay object may be graphically associated with augmentable object 210 in a different manner than under other circumstances. Specifically, for instance, FIG. 6A shows that form 406-0 may not be displayed directly on the target area of augmentable object 210 (e.g., the front face of augmentable object 210 in this example), but, rather, may be displayed adjacent to augmentable object 210 (e.g., floating in the air near the target area, partially overlapping with the target area, etc.). As further shown in FIG. 6A, form 406-0 may include an arrow, callout, or other such indicator to graphically associate the overlay object with augmentable object 210.

Figure 6B:
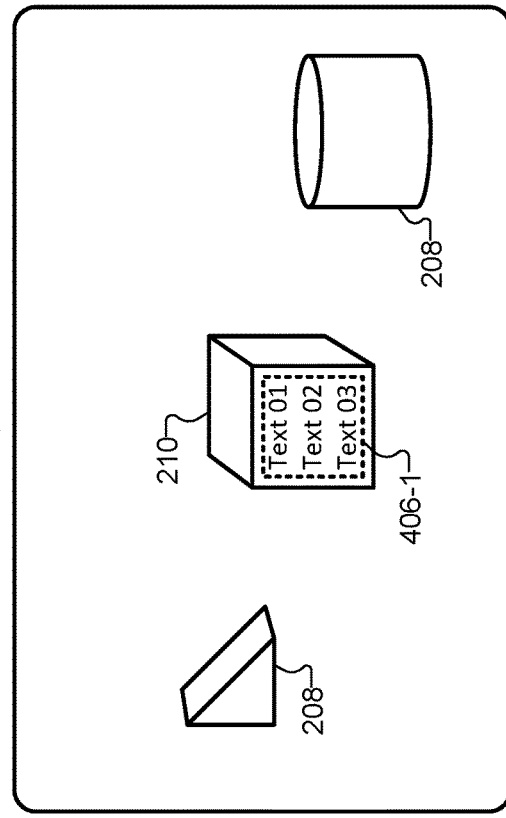

As the apparent proximity of augmentable object 210 changes (e.g., as the user and the object move in relation to one another), the apparent proximity of augmentable object 210 may eventually come to satisfy not only the first proximity threshold, but also the second proximity threshold. For example, as illustrated in FIG. 6B, augmentable object 210 may be displayed using between 5% and 20% of field of view 602-B. At this point, the same content of form 406-0 of the overlay object may be presented in form 406-1 (described above in relation to FIG. 4C), but, as shown, form 406-1 of the overlay object may now be graphically associated with augmentable object 210 by being positioned directly on the target area of augmentable object 210. Additionally, while form 406-0 was described above as being a statically-scaled form of the overlay object that could be graphically associated with augmentable object 210 while augmentable object 210 is relatively small, form 406-1 of the overlay object may be implemented as a dynamically-scaled form of the overlay object that may be continuously scaled and rescaled to fit the target area in a particular way (e.g., to fill the entire target area in this example).

Figure 6C:
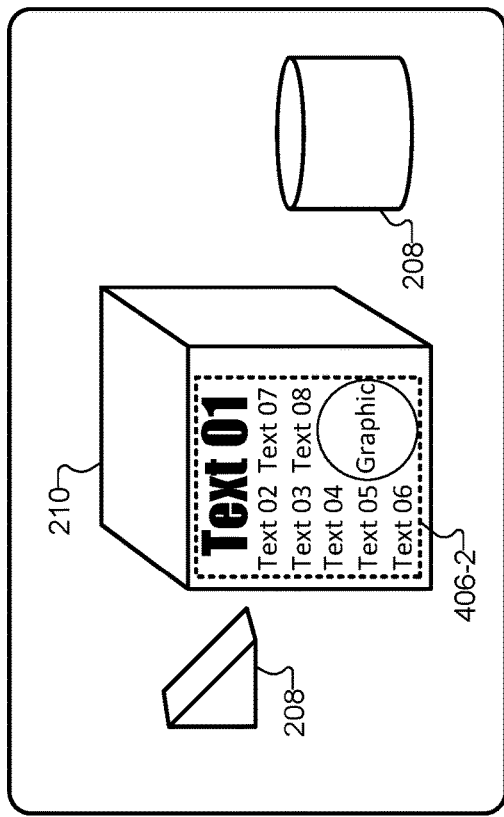

As the apparent proximity of augmentable object 210 continues to change (e.g., as the distance between augmentable object 210 and the user continues to decrease), the apparent proximity of augmentable object 210 may eventually come to further satisfy the third proximity threshold along with the first and second proximity thresholds. For example, as illustrated in FIG. 6C, augmentable object 210 may be displayed using between 20% and 35% of field of view 602-C. At this point, the target area of augmentable object 210 may be large enough that additional content beyond the minimal content of forms 406-0 and 406-1 of the overlay object may be included on form 406-2 of the overlay object (described above in relation to FIG. 4D) and may be legible or otherwise appreciable to user 202. Accordingly, as shown, form 406-2 of the overlay object may continue to be dynamically-scaled and graphically associated with augmentable object 210 by being perpetually positioned on the target area, but now may include additional content such as additional text, new text sizes, a graphic, and so forth.

As described above, the additional content included in form 406-2 may be any suitable content of any suitable content type. For example, while certain details or characteristics of the object's identity were not able to be determined when augmentable object 210 was relatively far away (as described above in relation to FIG. 6A), the apparent proximity of augmentable object 210 in field of view 602-C may now be such that system 100 is able to determine these additional details or characteristics (e.g., which specific bus is coming toward the user, which specific person is on the factory floor, etc.). Accordingly, some of the additional content added to form 406-2 of the overlay object that was not included on forms 406-0 and 406-1 may include information related to these additional details or characteristics. In the bus example, for instance, forms 406-0 and 406-1 may indicate only that a bus has been recognized to be coming in the user's direction, while form 406-2 may indicate details about which bus has been identified, details of the bus route, and so forth.

Figure 6D:
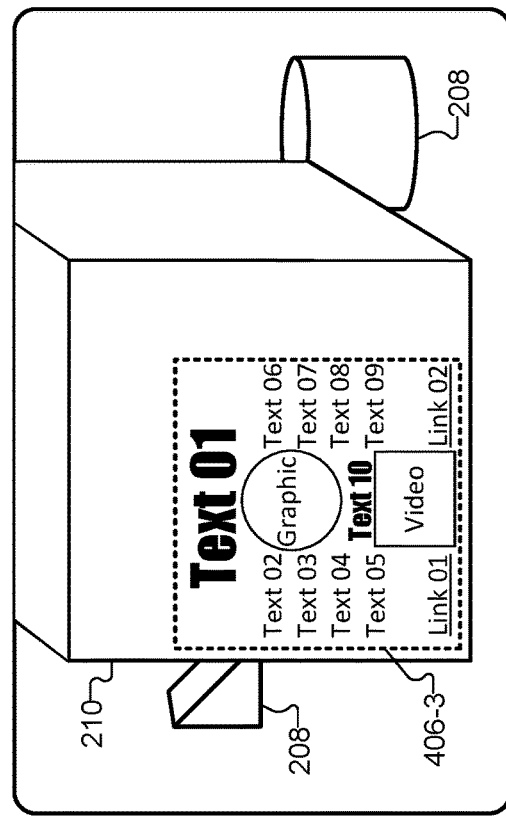

As the apparent proximity of augmentable object 210 continues to change (e.g., as the distance between augmentable object 210 and the user decreases even further), the apparent proximity of augmentable object 210 may eventually come to satisfy all of the proximity thresholds including the fourth proximity threshold. For example, as illustrated in FIG. 6D, augmentable object 210 may be displayed using between 35% and 100% of field of view 602-D. At this point, the target area of augmentable object 210 may be large enough that even more content may be added beyond the content of form 406-2, and that all of the content may be legible or otherwise appreciable to user 202. Accordingly, as shown, form 406-3 of the overlay object may include additional content such as additional text and text sizes, a video graphic, interactive links, and any other content as may serve a particular implementation.

In this closest proximity range, the target area of augmentable object 210 may be displayed on such a large portion of field of view 602 that it may not be desirable for form 406-3 to continue to be dynamically-scaled and graphically associated with augmentable object 210 by being perpetually filling the target area. For example, by continuing to dynamically scale form 406-3 of the overlay object to match the target area of augmentable object 210, it could become that case that it would become difficult, inconvenient, or annoying to user 202 to read the text or otherwise appreciate the content because the content is so big. Accordingly, form 406-3, like form 406-0, may be a statically-scaled form of the overlay object in certain examples. However, rather than being a minimum scale like form 406-0, form 406-3 of the overlay object may represent a maximum scale of form 406-3 that will be comfortable and convenient for user 202 to view and appreciate no matter how close the user's proximity to augmentable object 210 becomes (e.g., including even if augmentable object 210 fills 100% of field of view 602). In these examples, form 406-3 may be graphically associated with the target area of augmentable object 210 in any way as may serve a particular implementation. For instance, as shown in field of view 602-D, the overlay object may be aligned with a particular portion (e.g., a corner, a side, etc.) of the target area. In other examples, the overlay object may be centered within the field of view or placed in another static area of the field of view, or may otherwise be displayed in any manner that graphically associates the overlay object with augmentable object 210.

In the examples described and illustrated up to this point, system 100 has identified augmentable objects such as augmentable object 210 using machine vision or other such technologies when the augmentable objects are presented within the field of view being viewed by the user. It will be understood, however, that, in addition to these identification techniques, system 100 may also identify, recognize, detect, anticipate, or otherwise determine the presence of augmentable objects in the vicinity of user 202 using other techniques and technologies. In some instances, for example, the presence of one or more augmentable objects may even be determined before the augmentable objects are presented within the field of view.

As one example, system 100 may determine that an augmentable object is included within the extended reality world outside the field of view. System 100 may make this determination concurrently with the presenting of the field of view and prior to the identifying of the augmentable object from the set of objects presented in the field of view. This determination may be made in any suitable manner and/or using any suitable sensing technologies. For example, system 100 may determine that the augmentable object is included within the extended reality world outside the field of view by comparing 1) location data (e.g., GPS location data, Bluetooth beacon-based location data, WiFi-based location data, preprogrammed location data, etc.) generated by a sensor of system 100 and indicative of a real-time geolocation of the user, and 2) location data accessed by the extended reality presentation system and indicative of a real-time geolocation of the augmentable object.

More specifically, for instance, system 100 may maintain or access dynamic data representative of static or dynamically-tracked geolocations of one or more augmentable objects in the vicinity of the user. As such, by comparing a real-time geolocation of the user himself or herself (or, more particularly, of the extended reality presentation device being used by the user to experience the extended reality world) to the known geolocations of the augmentable objects in the vicinity of the user, system 100 may determine the presence of augmentable objects even before the objects are visible within the user's field of view. In various examples, sensors such as GPS sensors, Bluetooth beacons, WiFi receivers, smart tags (e.g., radio frequency identifier chips, etc.), and/or other suitable types of sensors may be used to help track individual people or objects in certain use cases as have been described herein or as may be served by particular implementations of the methods and systems described herein.

In response to the determination that an augmentable object is included within the extended reality world outside the field of view (e.g., in the vicinity of the user but not visible to the user), system 100 may be configured to present within the field of view a preview form of the overlay object to be graphically associated with the augmentable object when the augmentable object is subsequently presented in the field of view. As one example, a comparison of location data indicative of a geolocation of the user and location data indicative of a geolocation of a particular bus may reveal that the bus, while still out of sight for the user, is just around the corner. As such, a preview form of an overlay object may be presented indicating the bus is nearby until the bus comes into view and the preview form of the overlay object is replaced by a standard form of the overlay object graphically associated with the bus within the field of view. As another example, a comparison of location data indicative of a geolocation of the user and location data indicative of a geolocation of a point of interest such as a favorite restaurant of the user may reveal that the restaurant is only a short distance away from the user on the next street over. As such, a preview form of an overlay object may be presented to indicate that the restaurant is nearby and to guide the user toward the restaurant (if the user should choose to go there) until the restaurant comes into view and the preview form of the overlay object is replaced by a standard form of the overlay object graphically associated with the restaurant within the field of view.

Figure 7:
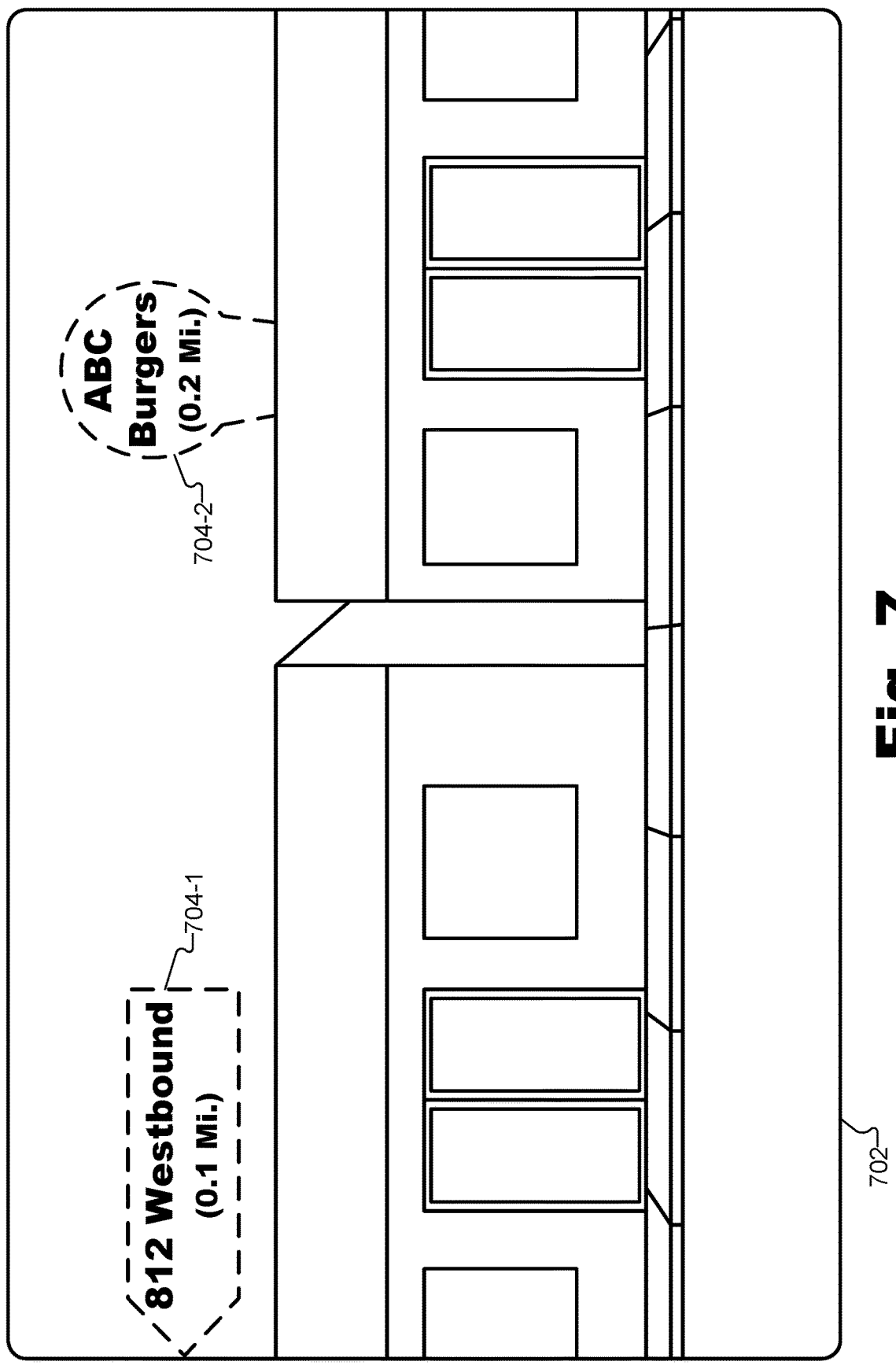
FIG. 7 illustrates exemplary preview forms of different overlay objects that are to be graphically associated with augmentable objects not yet visible in the field of view according to principles described herein.

To illustrate, FIG. 7 shows a field of view 702 depicting exemplary preview forms 704-1 and 704-2 of different overlay objects that are to be graphically associated with augmentable objects not yet visible in the field of view. Specifically, field of view 702 depicts a view of a street scene within an extended reality world that a user is experiencing. For example, the street, sidewalk, and buildings shown in field of view 702 may represent a street, sidewalk, and buildings at the location of the user as the user participates in an augmented reality experience.

Based on location data (e.g., GPS data or other sensor data) accessed or maintained by system 100, system 100 may determine that a particular bus (e.g., the 812 Westbound bus) is approaching on the street from the left. Even if the user has not turned his or her head to actually see the bus in the field of view, or even if the bus has not come into view from where the user is located, system 100 may present preview form 704-1 of an overlay object in field of view 702. In this way, when the bus passes in front of the user in field of view 702, or when the user turns his or her head left to see down the street and sees the bus coming, preview form 704-1 may automatically change into (e.g., transition into, be instantly replaced by, etc.) another form of the overlay object such as any of the forms described and/or illustrated above (e.g., one of forms 406 of the overlay object, depending on the apparent proximity of the bus at any given time). As shown, preview form 704-1 includes information about the bus that may be considered pertinent to the user. For example, preview form 704-1 of the overlay object indicates that the bus is the 812 Westbound bus and that it is 0.1 miles away. It will be understood that, just as with other forms of overlay objects described above, any content of any content type as may serve a particular implementation may be included on preview form 704-1 of the overlay object.

As another example also illustrated by FIG. 7, system 100 may determine (e.g., based on location data or the like) that a favorite restaurant of the user ("ABC Burgers") is on the next street over, but is not currently within view. For example, the system may automatically search for favorite restaurants at a particular time of day (e.g., lunch time) or when the user has indicated that he or she is searching for restaurants. While a restaurant is used in this example, it will be understood that other points of interest of other types (e.g., stores, theaters, homes or workplaces of the user's contacts, etc.) may similarly be identified in other examples. Even though the user cannot see the ABC Burgers restaurant in field of view 702, preview form 704-2 of an overlay object that is to be graphically associated with the restaurant when the restaurant does come into view is shown. Specifically, as illustrated in FIG. 7, preview form 704-2 may be made to appear as a large pin stuck in the ground a block away and rising up over the roofs of the buildings, or may take any other suitable form (e.g., an arrow pointing the way to the restaurant, etc.). In this way, if the user walks toward the large pin until the ABC Burgers restaurant is in view, preview form 704-2 may automatically change into another form of the overlay object such as any of the forms described and/or illustrated above. As shown, preview form 704-2 includes information about the restaurant that may be considered pertinent to the user. For example, preview form 704-2 of the overlay object indicates that the restaurant is an "ABC Burgers" restaurant and that it is 0.2 miles away. As described above in relation to form 704-1, it will be understood that any content or any content type may be included on preview form 704-2 of the overlay object.

Figure 8:
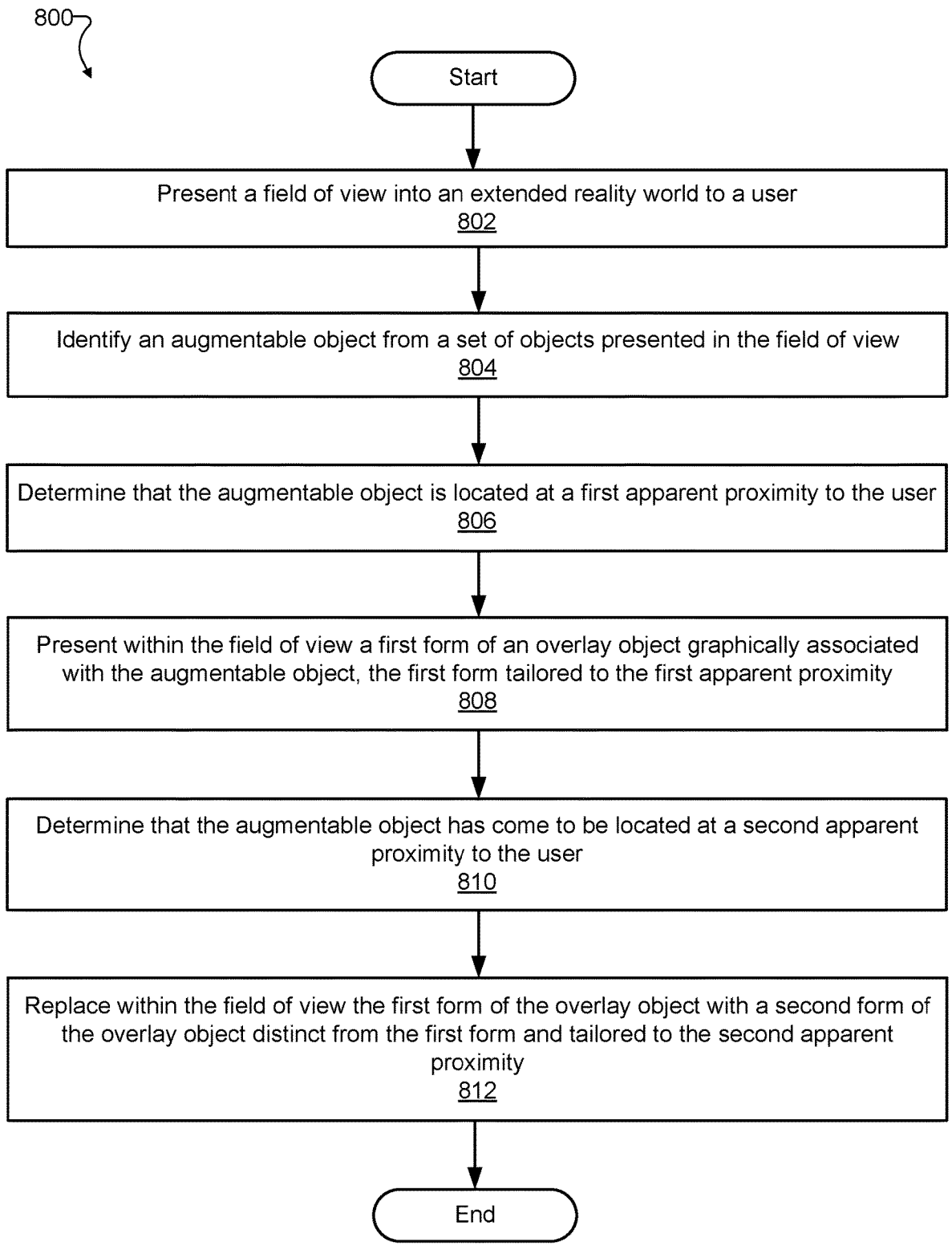
FIG. 8 illustrates an exemplary extended reality presentation method for automatically tailoring an extended reality overlay object according to principles described herein.

FIG. 8 illustrates an exemplary extended reality presentation method 800 for automatically tailoring a form of an extended reality overlay object based on an apparent proximity of an augmentable object to a user. While FIG. 8 illustrates exemplary operations according to one embodiment, other embodiments may omit, add to, reorder, and/or modify any of the operations shown in FIG. 8. One or more of the operations shown in FIG. 8 may be performed by system 100, any components included therein, and/or any implementation thereof.

In operation 802, an extended reality presentation system may present, to a user, a field of view into an extended reality world. Operation 802 may be performed in any of the ways described herein.

In operation 804, the extended reality presentation system may identify an augmentable object from a set of objects presented in the field of view. Operation 804 may be performed in any of the ways described herein.

In operation 806, the extended reality presentation system may determine that the augmentable object is located at a first apparent proximity to the user. For example, the extended reality presentation system may determine that the augmentable object is located at the first apparent proximity in response to the identifying of the augmentable object. Operation 806 may be performed in any of the ways described herein.

In operation 808, the extended reality presentation system may present, within the field of view, a first form of an overlay object graphically associated with the augmentable object. For example, the first form may be tailored to the first apparent proximity of the augmentable object to the user determined in operation 806. In some examples, the extended reality presentation system may present the first form of the overlay object in response to the determining, in operation 806, that the augmentable object is located at the first apparent proximity. Operation 808 may be performed in any of the ways described herein.

In operation 810, the extended reality presentation system may determine that the augmentable object has come to be located at a second apparent proximity to the user. For instance, the extended reality presentation system may make the determination of operation 810 subsequent to the determining in operation 806 that the augmentable object is located at the first apparent proximity. In some examples, the second apparent proximity may be distinct from the first apparent proximity. Operation 810 may be performed in any of the ways described herein.

In operation 812, the extended reality presentation system may replace, within the field of view, the first form of the overlay object with a second form of the overlay object. For example, the extended reality presentation system may replace the first form with the second form in response to the determining in operation 810 that the augmentable object has come to be located at the second apparent proximity. In some examples, the second form of the overlay object may be distinct from the first form and may be tailored to the second apparent proximity. Operation 812 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 9:
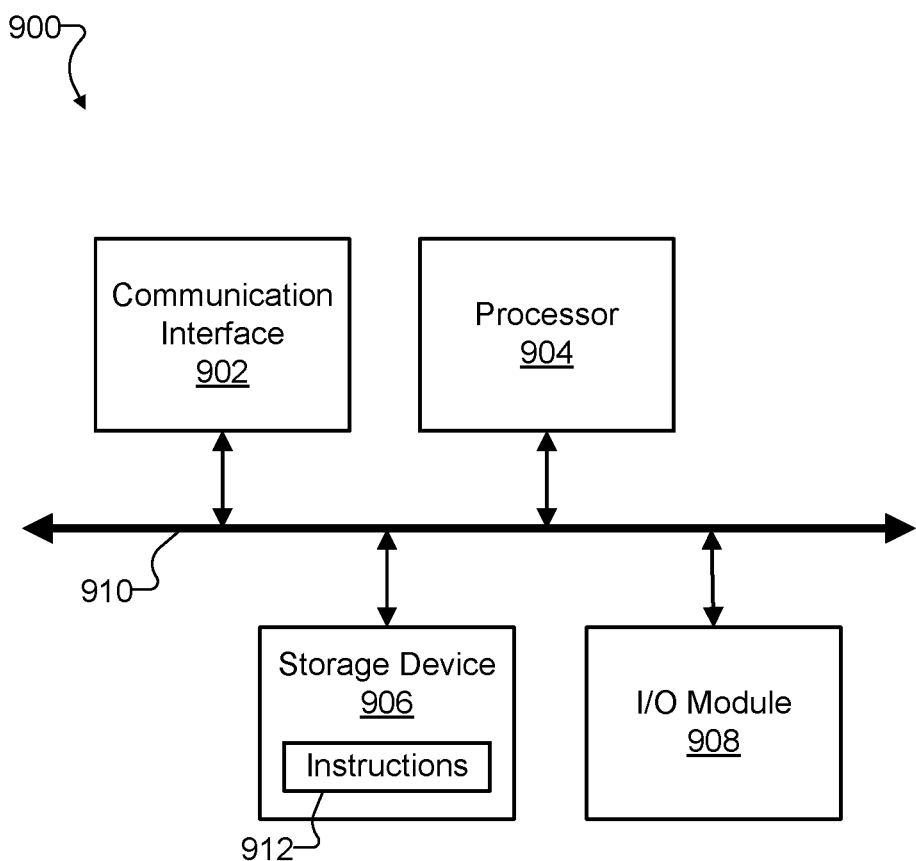
FIG. 9 illustrates an exemplary computing device according to principles described herein.

FIG. 9 illustrates an exemplary computing device 900 that may be specifically configured to perform one or more of the processes described herein. As shown in FIG. 9, computing device 900 may include a communication interface 902, a processor 904, a storage device 906, and an input/output ("I/O") module 908 communicatively connected one to another via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906.

Storage device 906 may include one or more data storage media, devices, or configurations and may employ any type, form, and combination of data storage media and/or device. For example, storage device 906 may include, but is not limited to, any combination of the non-volatile media and/or volatile media described herein. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 900. For example, storage facility 102 of system 100 may be implemented by storage device 906. Likewise, processing facility 104 of system 100 may be implemented by processor 904.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    presenting, by an extended reality presentation system to a user, a field of view into an extended reality world;
    identifying, by the extended reality presentation system, an augmentable object from a set of objects presented in the field of view;
    determining, by the extended reality presentation system in response to the identifying of the augmentable object, that a depiction of the augmentable object takes up a first portion of the field of view, wherein the first portion is representative of a first apparent proximity of the augmentable object to the user and the first apparent proximity serves as a proxy for a first actual proximity of the augmentable object to the user;
    presenting within the field of view, by the extended reality presentation system in response to the determining that the depiction of the augmentable object takes up a first portion of the field of view, a first form of an overlay object graphically associated with the augmentable object, the first form tailored to the first apparent proximity;
    determining, by the extended reality presentation system subsequent to the determining that the depiction of the augmentable object takes up the first portion of the field of view, that the depiction of the augmentable object has come to take up a second portion of the field of view, wherein the second portion is representative of a second apparent proximity of the augmentable object to the user and the second apparent proximity serves as a proxy for a second actual proximity of the augmentable object to the user; and
    replacing within the field of view, by the extended reality presentation system in response to the determining that the depiction of the augmentable object has come to take up the second portion of the field of view, the first form of the overlay object with a second form of the overlay object distinct from the first form and tailored to the second apparent proximity.

2. The method of claim 1, wherein:
    the extended reality presentation system is a mixed reality presentation system;
    the extended reality world comprises an augmented version of a real-world environment in which the user is located; and
    the presenting of the field of view comprises displaying the overlay object on a heads-up display screen that provides a view of the overlay object integrated with the real-world environment.

3. The method of claim 1, further comprising determining, by the extended reality presentation system, that the second apparent proximity represented by the second portion satisfies a predetermined proximity threshold that is not satisfied by the first apparent proximity represented by the first portion; and
    wherein the replacing of the first form of the overlay object with the second form of the overlay object is performed in response to the determining that the second apparent proximity represented by the second portion satisfies the predetermined proximity threshold.

4. The method of claim 1, further comprising:
    determining, by the extended reality presentation system concurrent with the presenting of the field of view and prior to the identifying of the augmentable object from the set of objects presented in the field of view, that the augmentable object is included within the extended reality world outside the field of view; and
    presenting within the field of view, by the extended reality presentation system in response to the determining that the augmentable object is included within the extended reality world outside the field of view, a preview form of the overlay object to be graphically associated with the augmentable object when the augmentable object is subsequently presented in the field of view.

5. The method of claim 4, wherein the determining that the augmentable object is included within the extended reality world outside the field of view comprises comparing:
    location data generated by a sensor of the extended reality presentation system and indicative of a real-time geolocation of the user; and
    location data accessed by the extended reality presentation system and indicative of a real-time geolocation of the augmentable object.

6. The method of claim 1, wherein the second form of the overlay object is distinct from the first form of the overlay object in at least one of the following ways:
    the second form includes different content than the first form;
    the second form includes a different type of content than the first form;
    the second form includes a different design than the first form;
    the second form is a different scale with respect to the augmentable object than the first form; and
    the second form is graphically associated with the augmentable object in a different manner than the first form.

7. The method of claim 1, wherein:
    the first apparent proximity represented by the first portion approximates the first actual proximity while not perfectly corresponding to the first actual proximity; and
    the second apparent proximity represented by the second portion approximates the second actual proximity while not perfectly corresponding to the second actual proximity.

8. An extended reality presentation system comprising:
    a memory storing instructions; and
    a processor communicatively coupled to the memory and configured to execute the instructions to:
        present, to a user, a field of view into an extended reality world, identify an augmentable object from a set of objects presented in the field of view, determine, in response to the identifying of the augmentable object, that a depiction of the augmentable object takes up a first portion of the field of view, wherein the first portion is representative of a first apparent proximity of the augmentable object to the user and the first apparent proximity serves as a proxy for a first actual proximity of the augmentable object to the user, present within the field of view, in response to the determining that the depiction of the augmentable object takes up the first portion of the field of view, a first form of an overlay object graphically associated with the augmentable object, the first form tailored to the first apparent proximity, determine, subsequent to the determining that the depiction of the augmentable object takes up the first portion of the field of view, that the depiction of the augmentable object has come to take up a second portion of the field of view, wherein the second portion is representative of a second apparent proximity of the augmentable object to the user and the second apparent proximity serves as a proxy for a second actual proximity of the augmentable object to the user, and replace within the field of view, in response to the determining that the depiction of the augmentable object has come to take up the second portion of the field of view, the first form of the overlay object with a second form of the overlay object distinct from the first form and tailored to the second apparent proximity.

9. The extended reality presentation system of claim 8, wherein:

the extended reality presentation system is a mixed reality presentation system;

the extended reality world comprises an augmented version of a real-world environment in which the user is located; and the presenting of the field of view comprises displaying the overlay object on a heads-up display screen that provides a view of the overlay object integrated with the real-world environment.

10. The extended reality presentation system of claim 8, wherein:

the processor is further configured to execute the instructions to determine that the second apparent proximity represented by the second portion satisfies a predetermined proximity threshold that is not satisfied by the first apparent proximity represented by the first portion; and the replacing of the first form of the overlay object with the second form of the overlay object is performed in response to the determining that the second apparent proximity represented by the second portion satisfies the predetermined proximity threshold.

11. The extended reality presentation system of claim 8, wherein the processor is further configured to execute the instructions to:

determine, concurrent with the presenting of the field of view and prior to the identifying of the augmentable object from the set of objects presented in the field of view, that the augmentable object is included within the extended reality world outside the field of view; and present within the field of view, in response to the determining that the augmentable object is included within the extended reality world outside the field of view, a preview form of the overlay object to be graphically associated with the augmentable object when the augmentable object is subsequently presented in the field of view.

12. The extended reality presentation system of claim 11, further comprising a geolocation sensor; and wherein the determining that the augmentable object is included within the extended reality world outside the field of view comprises comparing:

location data generated by the sensor and indicative of a real-time geolocation of the user, and location data accessed by the extended reality presentation system and indicative of a real-time geolocation of the augmentable object.

13. The extended reality presentation system of claim 8, wherein the second form of the overlay object is distinct from the first form of the overlay object in at least one of the following ways:

the second form includes different content than the first form;

the second form includes a different type of content than the first form;

the second form includes a different design than the first form;

the second form is a different scale with respect to the augmentable object than the first form; and the second form is graphically associated with the augmentable object in a different manner than the first form.

14. The extended reality presentation system of claim 8, wherein:

the first apparent proximity represented by the first portion approximates the first actual proximity while not perfectly corresponding to the first actual proximity; and the second apparent proximity represented by the second portion approximates the second actual proximity while not perfectly corresponding to the second actual proximity.

15. A non-transitory computer-readable medium storing instructions that, when executed, direct a processor of a computing device to:

present, to a user, a field of view into an extended reality world;

identify an augmentable object from a set of objects presented in the field of view;

determine, in response to the identifying of the augmentable object, that a depiction of the augmentable object takes up a first portion of the field of view, wherein the first portion is representative of a first apparent proximity of the augmentable object to the user and the first apparent proximity serves as a proxy for a first actual proximity of the augmentable object to the user;

present within the field of view, in response to the determining that the depiction of the augmentable object takes up the first portion of the field of view, a first form of an overlay object graphically associated with the augmentable object, the first form tailored to the first apparent proximity;

determine, subsequent to the determining that the depiction of the augmentable object takes up the first portion of the field of view, that the depiction of the augmentable object has come to take up a second portion of the field of view, wherein the second portion is representative of a second apparent proximity of the augmentable object to the user and the second apparent proximity serves as a proxy for a second actual proximity of the augmentable object to the user; and replace within the field of view, in response to the determining that the depiction of the augmentable object has come to take up the second portion of the field of view, the first form of the overlay object with a second form of the overlay object distinct from the first form and tailored to the second apparent proximity.

16. The computer-readable medium of claim 15, wherein:
the computing device is implemented within a mixed reality presentation system;
the extended reality world comprises an augmented version of a real-world environment in which the user is located; and
the presenting of the field of view comprises displaying the overlay object on a heads-up display screen that provides a view of the overlay object integrated with the real-world environment.

17. The computer-readable medium of claim 15, wherein:
the instructions further direct the processor to determine that the second apparent proximity represented by the second portion satisfies a predetermined proximity threshold that is not satisfied by the first apparent proximity represented by the first portion; and
the replacing of the first form of the overlay object with the second form of the overlay object is performed in response to the determining that the second apparent proximity represented by the second portion satisfies the predetermined proximity threshold.

18. The computer-readable medium of claim 15, wherein the instructions further direct the processor to:

determine, concurrent with the presenting of the field of view and prior to the identifying of the augmentable object from the set of objects presented in the field of view, that the augmentable object is included within the extended reality world outside the field of view; and present within the field of view, in response to the determining that the augmentable object is included within the extended reality world outside the field of view, a preview form of the overlay object to be graphically associated with the augmentable object when the augmentable object is subsequently presented in the field of view.

19. The computer-readable medium of claim 18, wherein:
the computing device includes a geolocation sensor; and
the determining that the augmentable object is included within the extended reality world outside the field of view comprises comparing:
location data generated by the sensor and indicative of a real-time geolocation of the user, and
location data accessed by the extended reality presentation system and indicative of a real-time geolocation of the augmentable object.

20. The computer-readable medium of claim 15, wherein:
the first apparent proximity represented by the first portion approximates the first actual proximity while not perfectly corresponding to the first actual proximity; and
the second apparent proximity represented by the second portion approximates the second actual proximity while not perfectly corresponding to the second actual proximity.

\* \* \* \* \*